(12) United States Patent
Graham

(10) Patent No.: US 7,241,322 B2
(45) Date of Patent: Jul. 10, 2007

(54) PYROLYZING GASIFICATION SYSTEM AND METHOD OF USE

(76) Inventor: Robert G. Graham, 6027 E. Grand Lake Rd., Presque Isle, MI (US) 49777

( * ) Notice: Subject to any disclaimer, the term of this patent is extended or adjusted under 35 U.S.C. 154(b) by 447 days.

(21) Appl. No.: 10/719,549

(22) Filed: Nov. 21, 2003

(65) Prior Publication Data

US 2005/0109603 A1    May 26, 2005

(51) Int. Cl.
*C10J 3/00* (2006.01)
*F23B 30/00* (2006.01)

(52) U.S. Cl. ............... 48/111; 48/209; 110/234; 110/231; 110/267

(58) Field of Classification Search ............ 48/111, 48/209; 201/25, 27; 110/234, 231, 267
See application file for complete search history.

(56) References Cited

U.S. PATENT DOCUMENTS

| 4,285,193 | A | | 8/1981 | Shaw et al. |
| 4,691,846 | A | * | 9/1987 | Cordell et al. ............. 222/198 |
| 4,971,599 | A | * | 11/1990 | Cordell et al. .............. 48/76 |
| 5,026,403 | A | * | 6/1991 | Michel-Kim ............... 48/203 |
| 5,138,957 | A | * | 8/1992 | Morey et al. .............. 110/234 |
| 6,381,963 | B1 | * | 5/2002 | Graham ................... 60/645 |
| 2004/0159269 | A1 | * | 8/2004 | Williams et al. ........... 110/231 |

* cited by examiner

*Primary Examiner*—N. Bhat
(74) *Attorney, Agent, or Firm*—Robert L. McKellar; McKellar IP Law, PLLC

(57) ABSTRACT

The gasifier includes a furnace bed segmented into individual cells, each cell is independently monitored using a ramp temperature probe, and provided with controlled air injection to provide individually controlled burn regions within the gasifier. Gasifier air injection includes tuyere arrays, lances, or both.

47 Claims, 26 Drawing Sheets

PYROLYZING GASIFICATION SYSTEM AND METHOD OF USE

BACKGROUND OF THE INVENTION

Gasification of biomass or other solid fuel is a process whereby air or oxygen is limited in the gasification chamber to achieve thermal degradation of complex materials with only partial combustion of the fuel. This limited air process is referred to as starved air, substoichiometric air, or pyrolysis. The latter, scientifically defined as the thermal degradation of complex material in an inert atmosphere or a vacuum is used herein and conventionally understood in the art to mean starved air or substoichiometric air. The resultant gases from this thermal degradation or gasification are subsequently oxidized in a second unit operation utilizing staged oxidation or staged introduction of air to complete or nearly complete the oxidation, or burn off, process. In application, this gasification and oxidation of fuel often includes a third step in which thermal energy is recovered from the flue gas using a heat recovery device such as a steam boiler or air-to-air heat exchanger. This thermal energy can be used, for example, to generate process steam, electrical power, or as a heat source for commercial applications such as supplying clean hot air to a lumber drying kiln.

It is important to be able to hold air within a gasifier at low (20–40 percent) substoichiometric air percentages. Maintaining low substoichiometric air percentages, specifically the percentage of air required for complete combustion, is critical because this allows the gasifier to maintain temperatures below the melting points of many solids and salts that start to sublimate, vaporize, and/or combust when the temperature gets above approximately 950 degrees F. At temperatures between 1100 and 1300 degrees F. most solids sublimate and go out the stack.

Conventional gasification systems, due to numerous sources of air leakage and/or poor air control, operate at substoichiometric air percentages of 40 to 60 percent. Thus these machines operate at higher temperatures. Operation at higher temperatures is undesirable since such operation leads to loss of ash, increased particulate emissions, and residual solid, and also leads to formation of corrosive slag. Slag is formed when salts are melted within the gasification chamber. Formation of corrosive slag attacks metal components within the gasifier and in downstream equipment, including grates and boiler tubes. When vaporized solids are discharged, a potentially valuable by-product of the process is lost since the ash or residual solids can have value. For example, when poultry litter is gasified, the residual ash is useful as fertilizer feedstock. In precious metal recovery applications, particulate carryover allows gold, silver, platinum, etc. to be discharged to the atmosphere. When coal is gasified, it is important to retain the residual sulfates to prevent acid-producing sulfur from being discharged to the atmosphere. Other conventional designs which attempt to operate at lower temperatures are not able to control the air at such low percentages, resulting in considerable hot-spotting and clinker formation wherever tramp air enters the system.

Fuel pile configuration within a gasifier is very important to achieving uniform gasification. A fuel pile which is peaked in the center causes uneven burning of the pile. A concave fuel pile causes build up and non-gasified fuel at the perimeter of the gasifier. The optimum fuel pile shape is an elliptical to relatively flat contour, and is achieved by careful synchronization of fuel feed with ash removal. Uniform gasification is further promoted when the dome contour mirrors fuel pile shape. However, conventional gasifiers use a circular dome.

Because of the finished size and weight of conventional gasification and oxidizing incinerators, they are constructed on site in a process which involves assembling an outer shell, including dome, sidewalls, furnace bed with grates and other assemblies, and fuel feed mechanism, and lining the unit with refractory brick or "gunning" refractory material on the interior sidewalls of the unit, and so on. This is a costly, labor intensive process. These gasification units tend to have many sources of air leakage, or "tramp air", as a result of this on-site construction. Tramp air is also associated with the use of feed, grate, and ash removal assemblies, especially in cases where these assemblies are moveable.

Conventional gasification systems, incorporating metal components, can operate with some success when burning uniform fuels such as like-sized wood chips. However, these units are not successful in burning non uniform solid fuels. Biomass fuels such as agricultural waste, bitumen, bovine, swine, and poultry manures, poultry carcasses, et cetera, are non-uniform in size, shape, water content, and material. Examples of other solid fuels which are non uniform include coal tailings, municipal solid waste, industrial waste, and medical waste. During combustion, non uniform fuels have a tendency to have areas of locally high temperatures, or hot spots. Hot spotting causes warping and failure of metal components, even when these components are provided with cooling mechanisms. Further, competitive metal units deteriorate rapidly if the system is cycled, for example, during start up and shut down. Use of specialized high-temperature metals to compensate for these problems is costly, and not always successful.

Conventional air injection systems, used to aerate the fuel pile within the gasifier, use plenums within the furnace bed and walls where the tuyeres are holes formed in the plenum. Plenums are large enclosed spaces formed below the furnace bed surface. Because of the location of the plenum beneath the fuel pile, the tuyeres tend to clog with ash. Further, changes in air pressure within a conventional gasifier cause ash to be drawn back into the plenum to the point of filling the plenum with ash. Because the plenum is within the furnace bed, maintenance of the conventional air injection systems is difficult and costly. Because the location of air injection is associated with locally higher burn rates and thus locally high temperatures, use of metal as a fabrication material is problematic. Even when provided with cooling mechanisms, metal air injection systems are associated with clinker formation and tend to fail, for example during power failure or when the fuel pile burns down.

Following initial, partial primary combustion within a gasifier, combustion gases are oxidized within a secondary combustion unit. Oxidation is intended to burn off remaining combustibles such as CO, hydrocarbons, and VOCs. Some environmental codes require that oxidation temperatures reach 2200 degrees F. to insure complete burnoff of these compounds. Unfortunately, depending upon the nitrogen content of the fuel and other variables, NOx may begin to form at 1800 degrees F. and increases exponentially with increasing temperature. For purposes of this discussion, the critical NOx formation temperature used is 2200 degrees F.

Modern oxidizers are required to balance complete burn-off of CO, hydrocarbons, and VOCs while minimizing formation of NOx, where the term "complete" is understood to mean "essentially complete" or "nearly complete" with only trace levels of the compound present in the flue gas, the trace levels being far below those levels allowed by code. Non-staging oxidizers reach flame temperatures above 2200 degrees F., form NOx, and are then cooled, thus burning off much of the CO, hydrocarbons, and VOCs but producing flue gas having high levels of NOx. Staged oxidizers exist in the prior art which are intended to achieve a better balance. Lewandowski et al. discuss a two stage oxidizer in U.S. Pat. No. 5,707,956 for reduction of NOx emissions from waste gas, where water and natural gas are injected into the waste gas to control combustion temperatures, and where there is no physical barrier separating the stages. U.S. Pat. No. 4,285,193 to Shaw et al describes a two zone combustion chamber where catalysts are used to provide efficient combustion. Both these patents require the use of external additives to achieve efficient combustion.

Heat energy recovery from the clean flue gas discharged from the oxidizer can be accomplished using many devices such as turbine systems, boilers, heat exchangers, and external combustion engines. Use of turbine systems in combination with heat exchanger systems are known, but are associated with high equipment costs and require input temperatures significantly lower than that produced by the gasifier/oxidizer system, to prevent damage to metal components. Use of external combustion engines such as Stirling cycle engines having gasification units as their heat energy source have also been previously contemplated. External combustion engines are reliable producers of electrical power at a fraction of the cost of turbine systems. However, firing external combustion engines using gases which are products of combustion has been unsuccessful in practice because of the high levels of particulate found in the flue gas of conventional gasifiers, and because of the low operating temperatures of conventional gasifiers.

There is a need for a pyrolyzing gasifier which can operate at low substoichiometric air percentages (10–30 percent) to maintain internal gasifier temperatures below 1100 degrees F. There is a need for a pyrolyzing gasifier which can tolerate general high temperatures, as well as hot-spotting and clinker formation. There is a need for an oxidizer which can provide complete burnoff of CO, hydrocarbons, and VOCs while forming minimal NOx, and still maintain exit temperatures at code levels. There is a need for a staged oxidizer which can achieve efficient combustion without requiring the use of external additives. There is a need for a reliable and low-cost system for pyrolyzing non uniform solid fuels such as biomass and wastes as a means of energy production. There is a need for a method of pyrolyzing non uniform solid fuels such as biomass, waste coal and bitumen as a means of reducing the volume of unwanted waste material which must be landfilled or otherwise stored. There is a need for a method of pyrolyzing non uniform solid fuels which transforms the fuel into recoverable, useful heat energy and useful ash.

SUMMARY OF THE INVENTION

The invention is directed to a pyrolyzing gasification system and its method of use. The inventive system and method includes partial primary combustion of biomass, or other solid fuel, within an inventive refractory lined gasifier, where this combustion occurs at low substoichoimetric percentages of 10–30 percent and at temperatures below 1000 degrees F. Following gasification, secondary combustion of the primary combustion gas is performed within an inventive staged, cyclonic, refractory lined oxidizer. Secondary combustion is staged and controlled for low NOx formation and complete combustion of CO, hydrocarbons, and VOCs. Following oxidation, heat energy is recovered from the oxidized flue gas using an indirect air-to-air all ceramic heat exchanger and/or an external combustion engine. The inventive system permits efficient gasification of non-uniform fuels which are non-uniform in size, shape, water content, and material. These fuels include, but are not limited to, forest products, rice hulls, wood chips, waste coal tailings, bovine, swine, and poultry manures, animal carcasses, as well as municipal, industrial and medical solid wastes.

An inventive pyrolyzing gasifier is described which is designed to provide primary combustion of biomass fuel at substoichoimetric percentages of 10–30 percent thereby maintaining temperatures below 1000 degrees F. This low substoichiometric air value is achieved through improved gasifier fabrication and assembly techniques, a design in which all internal components are stationary and formed of refractory materials, and, most importantly, through strict air control. This can be compared to other substoichiometric air gasifiers that allow tramp air in through grates, feed mechanisms, and ash removal systems, which cannot operate at percentages below 40 percent stoichiometric, causing temperatures to exceed 1000 degrees F.

The furnace bed of the gasifier is segmented into an annular array of individual cells, each cell having a generally wedge shape which includes a portion of the centrally aligned feed cone and a fuel hopper. By segmenting the furnace bed into individual cells, the fuel pile is transformed into a plurality of individually controlled burn regions. Each cell is monitored and controlled independently of other cells, ensuring that the entire fuel pile is burning uniformly and efficiently.

The inventive gasifier provides controlled air injection into the feed cone portion, on each surface of the fuel hopper, and when required, through and around the ash removal assembly at the bottom of the fuel hopper. Air injection is achieved using independently controlled manifolds via ceramic tuyeres, using independently controlled air injection lances which extend radially through the fuel pile, or using a combination of tuyeres and lances. The air injection design allows air flow in one cell to be adjusted independently of air flow in other cells, and allows air flow in an area of a given cell to be adjusted independently of the air flow in other areas of the same cell. The injected air may be continuous or pulsed. Pulsed air is advantageous because it reduces clinker formation.

The tuyeres of the inventive gasifier are an improvement over plenum-fed tuyeres of conventional gasifiers, where ash blockages are common, and interruption of air pressure within the gasifier can cause ash to be drawn into the plenum. The inventive tuyere system disclosed herein uses manifolds rather than plenums, and the manifolds and tuyeres are externally accessible. The manifolds are removable from the tuyeres to allow cleaning and replacement of the manifold. The tuyeres, oriented horizontally or angled slightly downward to resist ash intake, are inexpensive and easy to build, easily cleaned from the outside, and allow resizing of the tuyere for adjustment of rate of air flow.

Air injection lances are equi-spaced, radially aligned, and form a hearth that gives uniform air injection throughout the fuel pile. The lances are formed of a dense, fine-grained silicon carbide ceramic which is highly wear resistant and to which ash does not stick. The lances can be fixed, or alternatively, stroke in and out or twist as required by the characteristics of the fuel being burned. For example, fuels that tend to clinker and/or bridge would require lances which translate and/or twist.

Fuel feed and burn rate is controlled within each cell using a unique ceramic sensor tube which allows simultaneous measurement of fuel pile temperature at multiple locations within the fuel pile. Temperature information from the sensor tube is used to monitor burn rate and pile height, and is used to adjust air flow, fuel feed, and ash removal, allowing maximized fuel burn within each cell.

Ash is removed from the underside of each cell using an all-ceramic auger-type or ram-type ash removal system. The auger-type ash removal system is provided with air injection means formed in the hollow auger tube. Air flow through the ash auger is adjustable. Additionally, the auger blades are provided with a graduated spacing to maintain the top of the fuel bed in a generally level configuration. The ash auger is operated at a constant rate which is tied to the rate of fuel feed to avoid bridging of the fuel pile. This rate is generally very slow as there is normally only 2 to 25 percent ash produced within the inventive gasifier. The ash auger moves the ash into a common housing where, in turn, it is dropped into a wet bottom to maintain an air seal or, alternately, into a guillotine, dual chamber air lock bottom which does not require water for sealing. The ash auger assembly can be removed from the outside of the gasifier.

The dome of the inventive gasifier has been designed specifically for biomass gasification applications. In this design, the arcuate shape is flattened to match the shape of the fuel pile within the gasifier so that it is hemi-elliptical, having a height to width ratio of 1 to 2 or 3. Because all biomass materials when burned produce energy in the normal range of 3500 to 6500 BTU/lb as fired, it is possible to optimally position the height of the dome relative to the furnace bed at a position that is lower than for conventional gasifiers. Finally, the dome is completely factory fabricated, lined, and shipped ready to install to the construction site. This includes a light weight refractory lining. Use of a light weight refractory lining provides economic benefit by avoiding on-site assembly of a dome steel shell which must then be lined in the field with refractory material.

Combustion gases from the pyrolyzing gasifier are transferred to a staged, cyclonic, oxidizer having all-refractory internal surfaces. Internal baffles physically segregate the interior of the oxidizer into three stages. The internal baffles cause a cyclonic air flow path through the oxidizer, resulting in excellent mixing within the oxidizer. Most biomass fuels have a higher bound nitrogen content than fossil fuels, resulting in higher production of NOx when burned. Staging within the oxidizer burns the combustion gases at temperatures which are low enough to reduce the formation of NOx, which forms at temperatures at or greater than 2200 degrees F., keeping the formation of NOx below code levels. Staging also allows the combustion gases to burn over a long enough period of time to complete the burnout of CO, resulting in a very clean flue gas. Use of all-refractory internals allows combustion temperatures which allow burnoff of CO, hydrocarbons, and VOCs.

A high temperature all-ceramic ejector assembly is provided immediately downstream of the gasifier at the fluid inlet to the oxidizer and is critical to completing combustion in the oxidizer with minimal formation of NOx and getting good mixing to burn off CO, hydrocarbons, and VOCs. Placement of the high temperature ejector assembly at this location is key because it allows creation and control of a negative draft within the gasifier, regardless of system conditions downstream of the gasifier. The high temperature ejector assembly is adjustable allowing profiling of the flame pattern and adjustments to the draft. Unlike competitive designs, this allows the good mixing of the air and combustion gases within the flame envelope, rather than using peripheral tuyeres or air introduction outside the flame envelope.

Secondary air injection is provided within the oxidizer itself. Tuyeres are formed in each baffle which control air temperature within the oxidizer and spin the flue gas. The induced cyclonic air flow promotes better mixing and residence time to complete the oxidation of combustibles and keeps combustion temperatures relatively low to minimize NOx formation.

A trim valve is provided at the outlet from the oxidizer which allows air to be injected into the exiting, clean flue gas. When desired, the trim valve is used to adjust the temperature of the clean flue gas without changing the flue gas mass flow from the oxidizer. This feature is useful when the clean flue gas is sent to a heat recovery device such as an indirect air-to-air heat exchanger for use in certain applications such as drying kilns in the wood industry, which require constant mass flow of clean, heated air throughout a drying cycle. In this example, the temperature of the flue gas from the oxidizer is modified using the trim valve without changing mass flow through the system.

Clean flue gas is then transferred to a heat recovery device. For purposes of illustration, the system described herein employs an all-ceramic air-to-air indirect heat exchanger, as described in my U.S. Pat. Nos. 5,775,414, 5,979,543, and 6,206,603, and incorporated herein by reference. However, it is well within the scope of the art to substitute other heat recovery devices such as, but not limited to, metal heat exchangers, steam boilers and hot oil systems for the ceramic heat exchanger as required by the specific application of this technology. When the process operates with a high oxidized flue gas temperature or requires clean, hot air at high temperatures as supplied by the inventive biomass gasification/oxidation system described herein, the all-ceramic heat exchanger is the practical selection. The most efficient process utilizes a flue gas at a temperature of 2200 degrees F. Conventional metal heat exchangers cannot operate at this temperature. In processes where very high temperature air is not required, the temperature of the clean air exiting the oxidizer can be modified and alternative heat recovery devices may be used.

In an alternative embodiment, the system described herein may also employ an external combustion engine as a heat energy recovery device. By inclusion of a heat engine or external combustion engine such as a Stirling cycle engine in the system, the energy produced within the gasifier and/or oxidizer can be used for power generation for use in other processes. Furthermore, because the external combustion engine requires high temperature input (approximately 1800 degrees F.) and discharges at a moderate temperature (approximately 1500 degrees F.), the output from the external combustion engine can be used in the system to obtain increased system efficiencies. For example, output from the external combustion engine can be used as a source of preheated combustion air for use in the gasifier or oxidizer, or can be sent to heat exchanger for additional heat energy recovery.

External combustion engines are well suited for used in the inventive system because they are known to be very reliable, are available at relatively low cost, and require high temperature energy flue gas of low particulate level as an input energy source. The inventive gasifier system provides flue gases having no acids and particulate levels of 0.02 grains per standard cubic foot or less, which is well below code levels and well suited for use with an external combustion engine, and provides these flue gases at temperatures up to 2200 degrees F.

The inventive gasifier, oxidizer, and heat exchanger are constructed having all internal structures formed of refractory material. Refractory material is impervious to corrosive slag and other chemical attacks. It can operate at temperatures up to 2400 degrees F. without failure, and easily tolerates temperature cycling (for example, when starting up and shutting down the system). Refractory material is wear-resistant and has a long useful life. The all-refractory construction allows the user to employ preheated combustion air through tuyeres into the gasifier, or into the oxidizer to increase system efficiency. Use of an all-ceramic heat exchanger allows the high temperature discharge from the oxidizer to be sent directly to the all-ceramic heat exchanger without a need for tempering the discharge. This allows complete recovery of the heat energy generated in the oxidizer. For additional increases in system efficiency, a second heat exchanger may be employed downstream of the all-ceramic air-to-air indirect heat exchanger. The second heat exchanger may be all-ceramic, all-metal, or preferably, a metal heat exchanger having internal surfaces coated with a thermal barrier.

A method of pyrolyzing solid organic wastes to obtain useable ash and clean heat energy, at relatively low temperatures (below 1000 degrees F.), and without generating toxic by-products will be described. The method includes using an all-refractory gasifier, oxidizer, and heat exchanger system to provide primary and secondary combustion of biomass followed by heat energy recovery, where strict air control throughout the process ensures gasification at air levels of 10–30 percent substoichiometric air and relatively low-temperature oxidation. The method also includes staging and control of secondary combustion to provide a clean flue gas that can be used in heat energy recovery.

Within the gasifier, biomass fuel is fed into the individual cells of the gasifier from below the furnace bed along the central vertical axis using conventional means such as a vertical auger. The fuel is received within a fuel collection hopper within each cell, where air flow into the fuel is controlled and temperatures within and around the fuel pile are monitored. Gasification of the fuel is continuous since the fuel feed rate is synchronized with the ash removal rate.

The flue gas discharge from the center top of the gasifier has additional air cyclonically introduced to start completing the combustion. The flue gas is then sent directly into an all-ceramic oxidizer where final combustion is staged and controlled to hold excess air exit temperature at 2200 degrees F. or lower to produce a flue gas having NOx, CO, hydrocarbons, and VOCs which are minimal and well below code levels. The gas is held at this temperature for a minimum of one to two seconds to complete the oxidation of VOCs, hydrocarbons, and CO.

The gas then enters a heat recovery device, which may include, but is not limited to, a conventional boiler or a ceramic air-to-air heat exchanger, so that energy can be recovered from the clean flue gas. The clean, hot air from the ceramic heat exchanger can reach temperatures to 2000 degrees F. and is used, for example, to calcine products, dry wet wastes being introduced into the gasifier, or dry lumber in conventional dryer kilns. In the latter case, moist air is pulled in from the dryer kiln and returned to the air side of the ceramic heat exchanger, mixed with ambient air that gives a controlled dryer kiln entrance temperature between 250 and 750 degrees F.

The temperature of the air entering the heat recovery device is controlled by increasing and decreasing the exit air temperature from the low NOx oxidizer and/or using a trim valve to control temperature of the oxidizer flue gas discharge. This allows the gasifier to run at a constant rate and, at the same time, allows the air exiting from the heat exchanger to run at a constant rate and still control both its temperature and humidity. Conventional processes, using metal heat exchangers or base-loaded boilers, have to vent air or vent high temperature flue gases. The use of the ceramic heat exchanger allows for higher gasifier discharge temperatures and a more efficient system than the use of metal exchangers that cannot tolerate the higher service temperatures. Control of a ceramic heat exchanger is superior to the control of a boiler, which can only be accomplished quickly by venting steam. The latter can be difficult to control and has a slow response.

The method of pyrolyzing solid fuels such as non uniform wastes to obtain useable ash and recover heat energy has several novel features: The gasifier is all ceramic and operates in starved air conditions within which air flow is provided in strict control. Acidic combustion gas from the gasifier is processed within an all-ceramic, uniquely staged oxidizer where combustion is maintained at relatively low temperatures to produce a clean flue gas having low NOx, and having VOC, hydrocarbons, and CO at levels that are well below code. Energy recovery is accomplished using an all-ceramic heat exchanger or conventional methods of energy recovery such as boilers. The method of pyrolyzing non uniform solid wastes can produce a useful ash for use as a fertilizer both in direct application to and as a feed stock for fertilizer production. By reducing the solid wastes to ash form, enormous waste volume reduction is achieved. For example, pyrolysis of wood provides an approximate volume reduction of 98 percent, and pyrolysis of poultry litter provides an approximate volume reduction in the range of 70 to 90 percent.

DETAILED DESCRIPTION OF THE INVENTION

Figure 1:
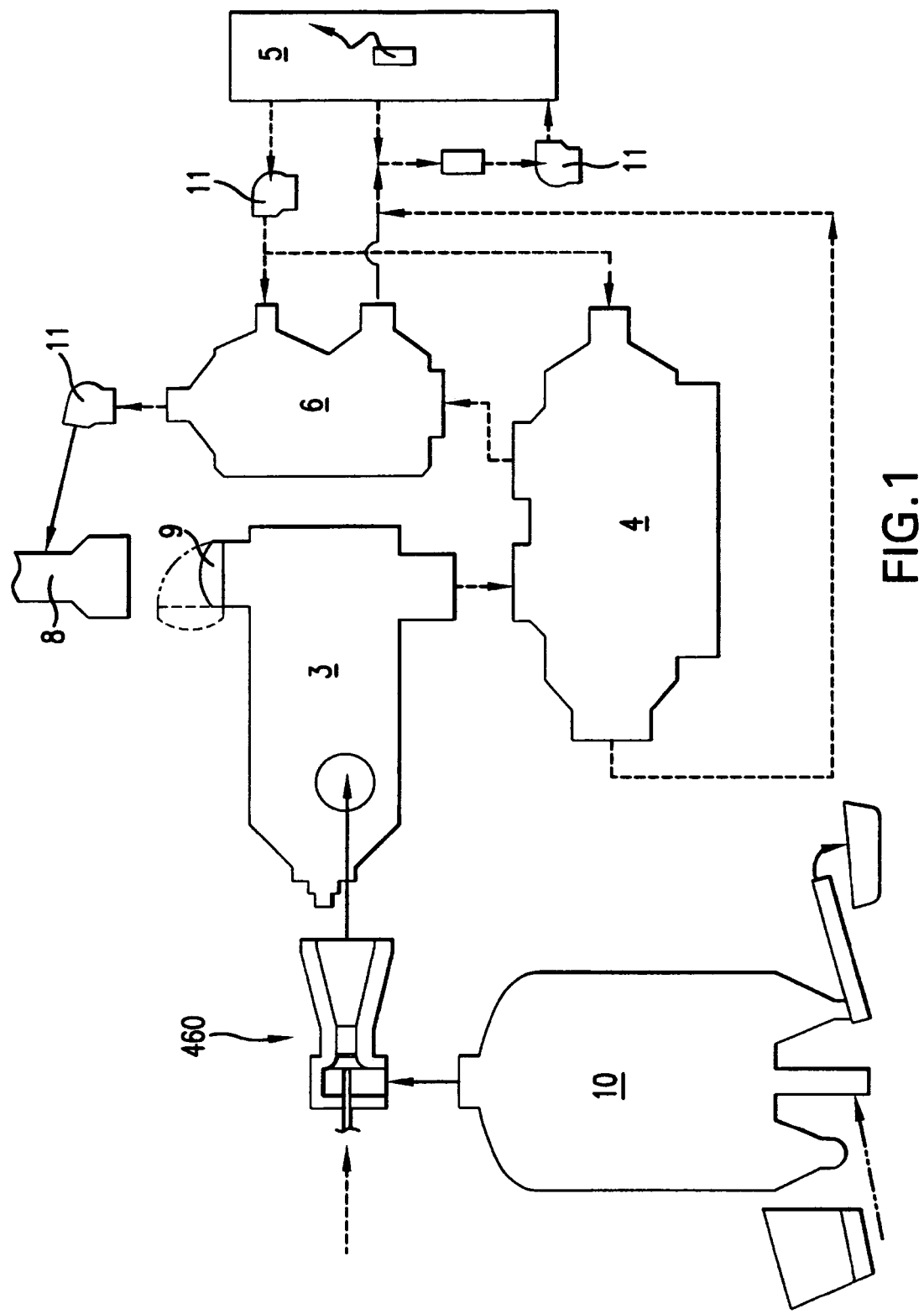
FIG. 1 is a schematic view of the system for pyrolyzing biomass to obtain useable ash and heat energy. Solid lines indicate flow of biomass combustion gas through the system, broken lines indicate flow of gases through the heat recovery portion of the system, and dashed-broken lines indicate solid materials entering and leaving the system.

Referring now to the figures, the pyrolyzing gasification system and its method of use will now be described in detail. A schematic illustration of the system, shown in FIG. 1, includes an all-refractory gasifier 10, an all-refractory, staged cyclonic oxidizer 3, and an all-refractory air-to-air indirect heat exchanger 4. The inventive system for recycling biomass waste into useful ash and recoverable heat energy without formation of toxic by-product gases provides partial primary combustion of biomass, or other solid fuel, within pyrolyzing gasifier 10. This combustion occurs at low substoichiometric air percentages of 10–30 percent and at temperatures below 1000 degrees F., forming a useable ash and a primary combustion flue gas. Following gasification, secondary combustion of the primary combustion flue gas is performed within a staged, cyclonic oxidizer 3, forming a generally clean oxidized flue gas. Following oxidation, heat energy is recovered from the oxidized flue gas using an indirect air-to-air all ceramic heat exchanger 4 and/or an external combustion engine.

For increased system efficiencies, additional heat energy can be recovered downstream of the indirect air-to-air all ceramic heat exchanger 4 using one or more metal heat exchangers 6. Reference number 5 represents an external element or process which uses the heat energy recovered by heat exchangers 4, 6. This external element or process is interchangeable and may include, but is not limited to, a power generator, product calciner, a process for drying wet wastes prior to their being introduced into the gasifier 10, hot water boiler, or a lumber drying kiln.

All-Refractory Gasifier

Figure 1A:
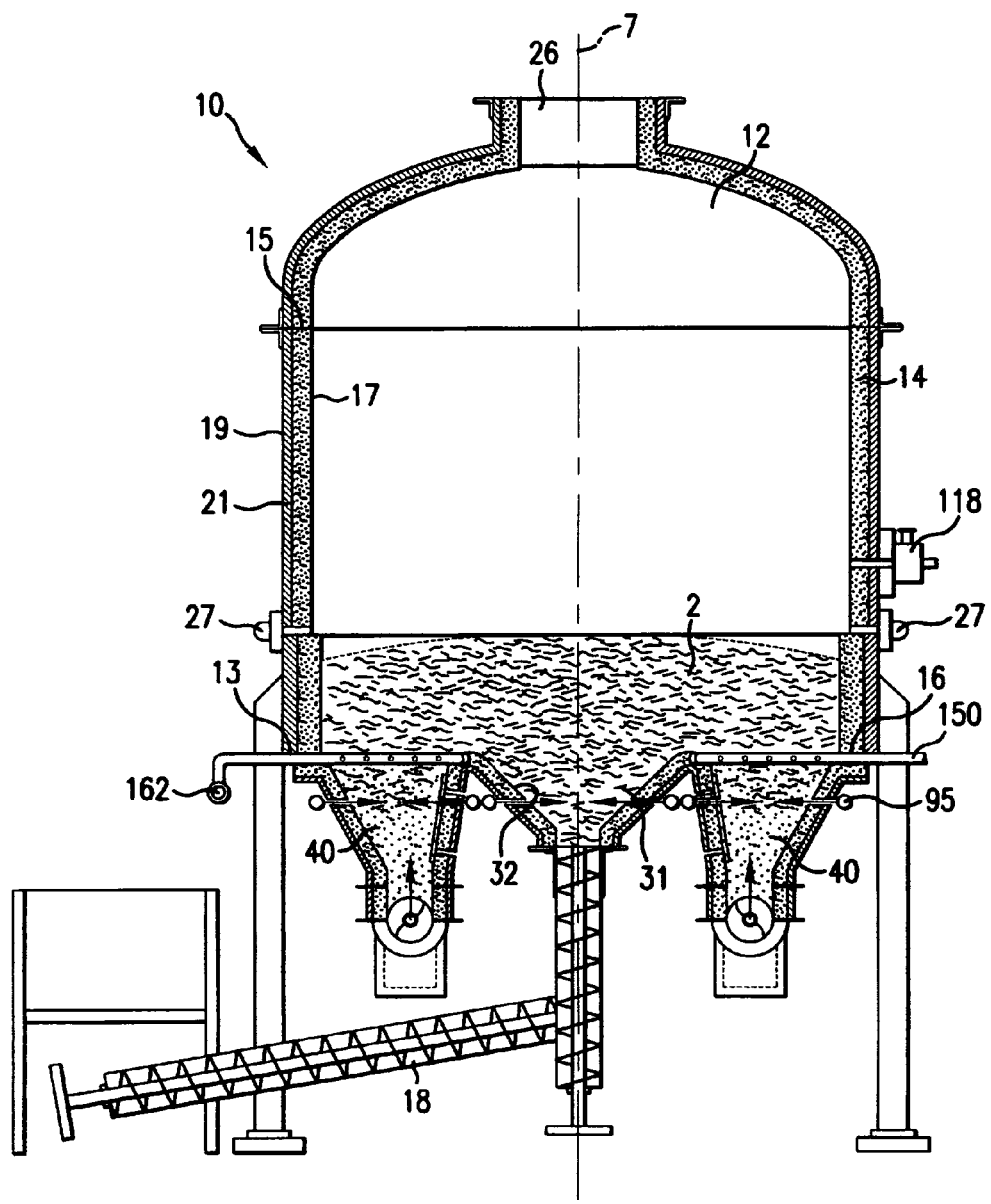
FIG. 1A is a side sectional view of the inventive gasifier illustrating the elliptical dome, and configuration of the segmented furnace bed.

Gasifier 10 (FIG. 1A) includes a dome 12, cylindrical sidewall 14, furnace bed 16, and feed apparatus 18. Dome 12 closes and seals the upper end of gasifier 10, and consists of an arcuate steel body which is hemi-elliptical in section. In the preferred embodiment, the hemi-elliptical section is provided with a height to diameter ratio of at least 1 to 2, most preferably 1 to 3. This sectional shape provides a dome which closely mirrors the shape of the fuel pile within furnace bed 16, allowing better gasification efficiency, and a more uniform burn of the fuel pile. Combustion gases are drawn from the top of the dome, rather than from the side as shown in some competitive designs. By drawing gases from the top of the dome, a uniform gas flow upwards through the fuel pile to the outlet is provided. This is preferable to a side discharge, where the products of combustion and volatiles are drawn across the top of the fuel pile, resulting in a non-uniform velocity. Dome 12 is completely lined with refractory material, and resides at the upper edge 15 of sidewall 14.

Sidewall 14 is a hollow steel cylinder which extends between dome 12 along its upper edge 15 and furnace bed 16 along its lower edge 13. Sidewall 14 is provided in a height which gives optimal spacing between the dome and the top of the fuel pile, and provides the most efficient internal volume for pyrolysis, based on calculations of energy released during burning biomass wastes. This height is generally lower than for conventional gasifiers.

At locations above fuel pile 2, including mid- and upper-portions of sidewall 14 and dome 12, the internal surfaces of gasifier 10 are lined with a light weight refractory brick and insulated to hold the outer steel shell at low temperatures and minimize setting heat loss. By insulating in these areas, there is a significant reduction in weight when compared to competitive designs that use hard brick or dense castables. At locations which are at or below the level of the fuel pile, sidewall 14 is completely lined with dense, fine-grained, low creep, wear resistant castable refractory. This is the same refractory material used in the furnace bed described below, and is designed to take slagging, hot-spotting, and erosion. If required by the specific application, tuyeres may be included along the lower perimeter of this wall (not shown).

Furnace bed 16 is formed by assembling a plurality of individual modular cells 20. Each cell 20 is completely refractory lined with dense, low creep, wear resistant castable refractory. This refractory material is designed to take slagging, hot-spotting, and erosion. Each cell 20 is generally wedge shaped, consisting of a base 22, an apex 24, a first lateral side 54 and a second lateral side 56. Base 22 has an arcuate contour which is identical to that of sidewall 14, and apex 24 is truncated adjacent the vertical centerline 7 of gasifier 10. First lateral side 54 is spaced apart from second lateral side 56 such that the respective lateral sides converge from base 22 to apex 24.

Figure 2:
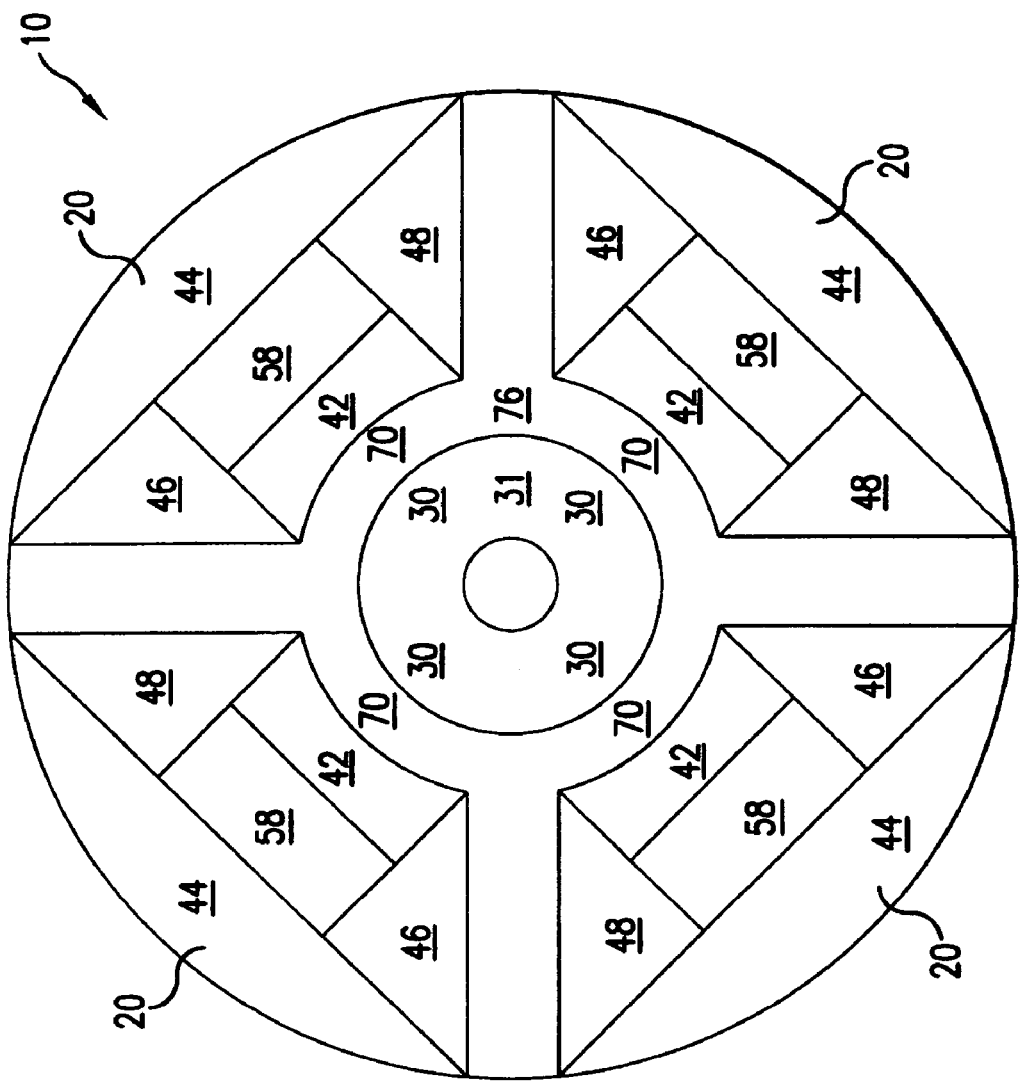
FIG. 2 is a top sectional view of the furnace bed of a 4-cell gasifier illustrating the placement of the fuel collection hopper and feed cone within each of the wedge-shaped cells.
Figure 2A:
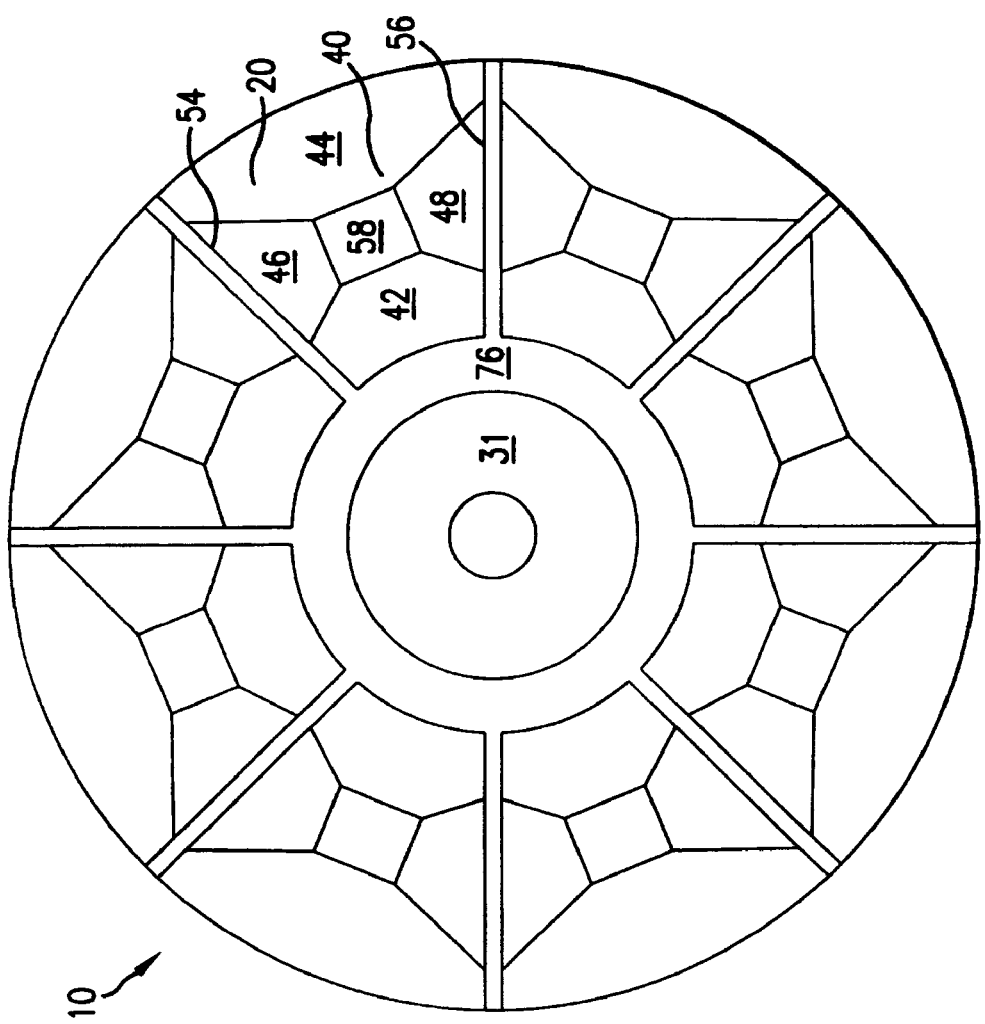
FIG. 2A is a top sectional view of the furnace bed of an 8-cell gasifier illustrating the placement of the fuel collection hopper and feed cone within each of the wedge-shaped cells.

The plurality of individual cells 20 are joined together along their respective lateral sides 54, 56 so as to provide furnace bed 16 which is annular in shape and segmented along lateral sides 54, 56. In the preferred embodiment, furnace bed 16 is formed using four cells 20 (FIG. 2). Larger gasifiers 10 may employ 8 cells (FIG. 2A) or more.

Each cell 20 includes a feed cone portion 30 and a fuel collection hopper 40. Feed cone portion 30 generally overlies apex 24 of the wedge and fuel collection hopper 30 resides between the feed cone portion and base 22, or sidewall 14. Fuel collection hopper 40 is separated from feed cone portion 30 by an arcuate, generally horizontal rim section 70.

Figure 3:
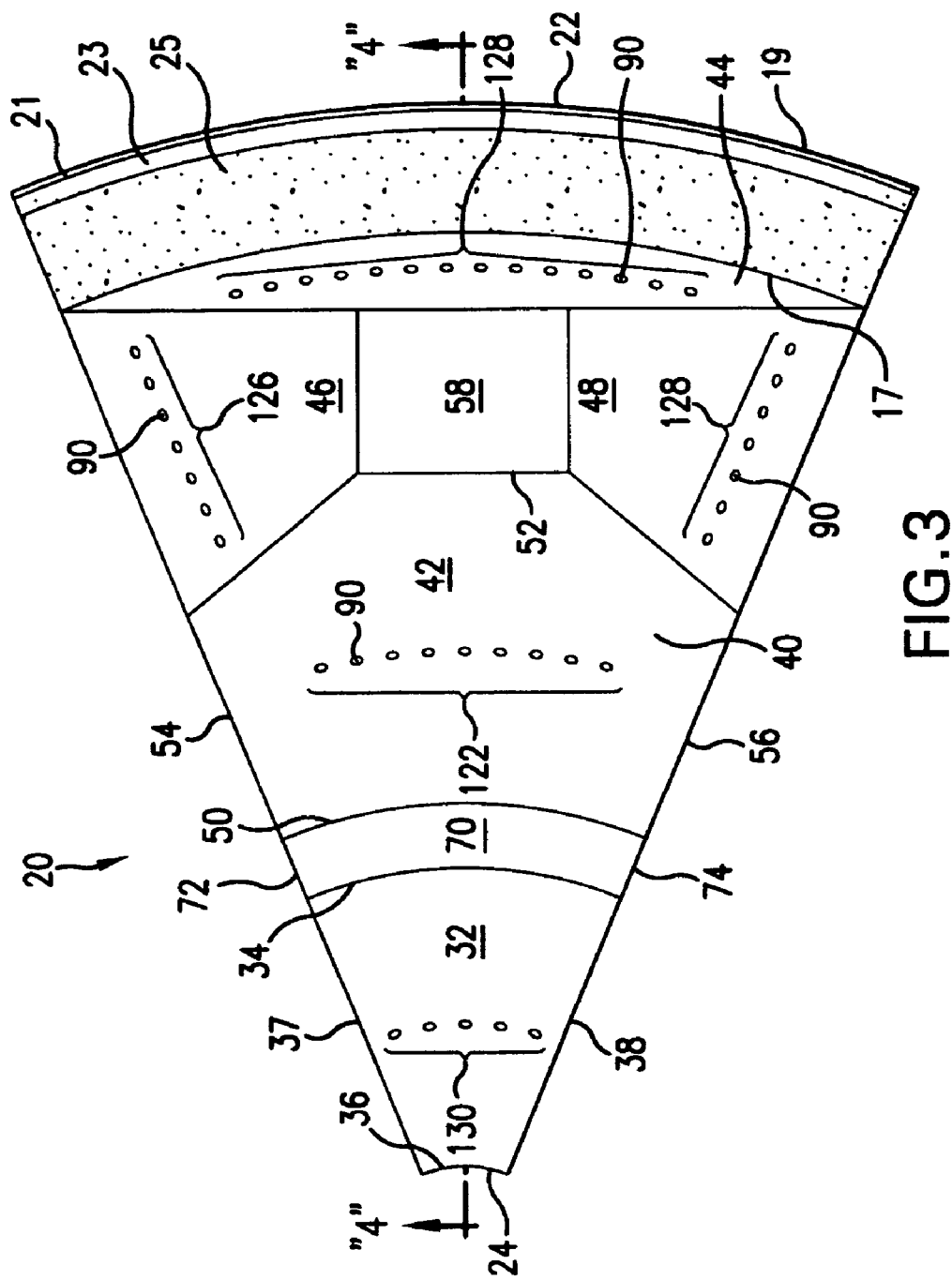
FIG. 3 is a top view of an individual wedge-shaped cell from an 8 cell gasifier illustrating the feed cone portion adjacent the apex of the wedge, the fuel collection hopper between the apex and the base of the wedge, and tuyere arrays on the feed cone portion and within the fuel collection hopper.
Figure 4:
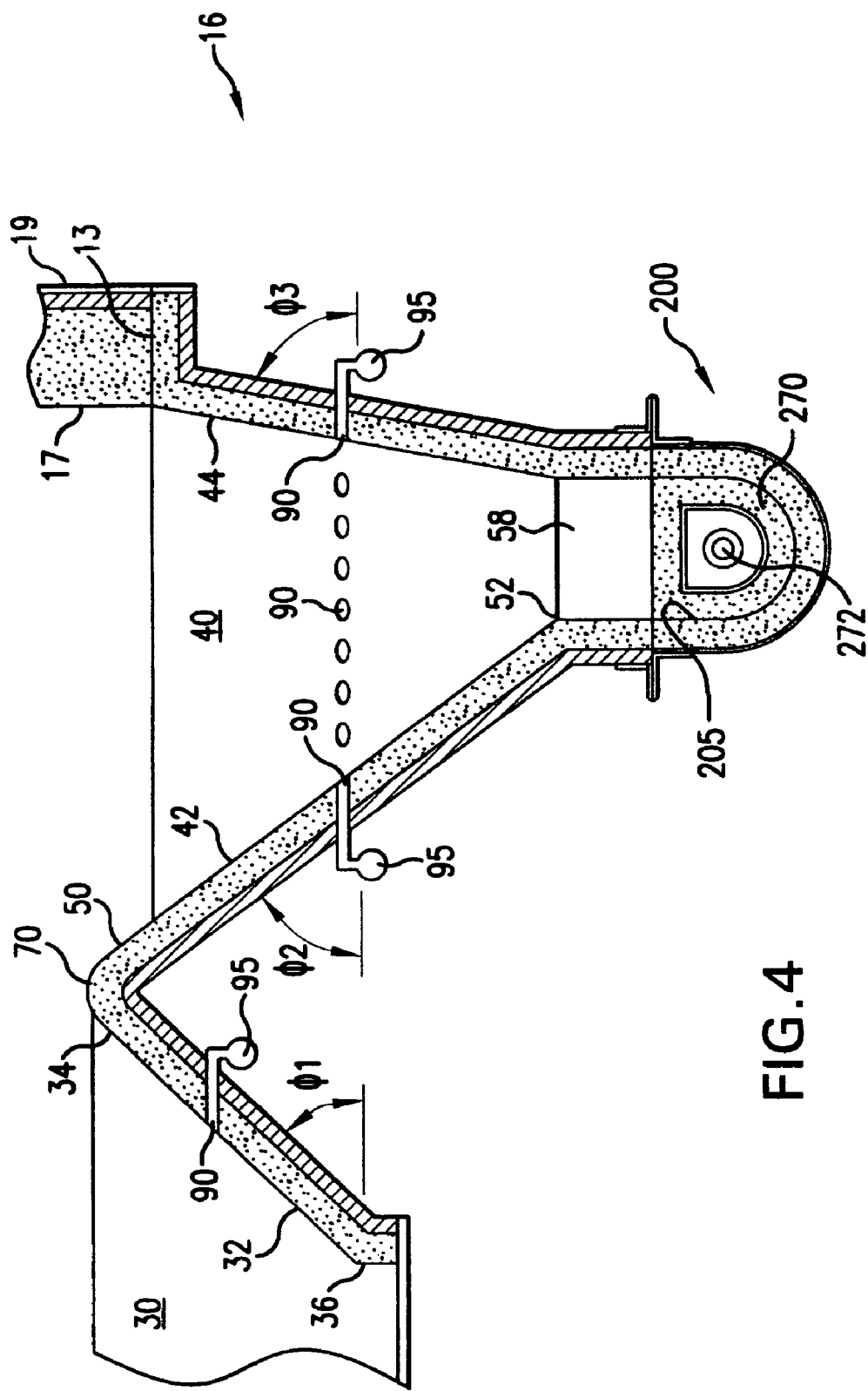
FIG. 4 is a sectional view of an individual cell across line 4—4 of FIG. 3 illustrating the angled walls of the feed cone portion and the fuel collection hopper, the relationship between the tuyeres and the tuyere manifolds, and the ram type ash removal assembly below the fuel collection hopper.
Figure 5:
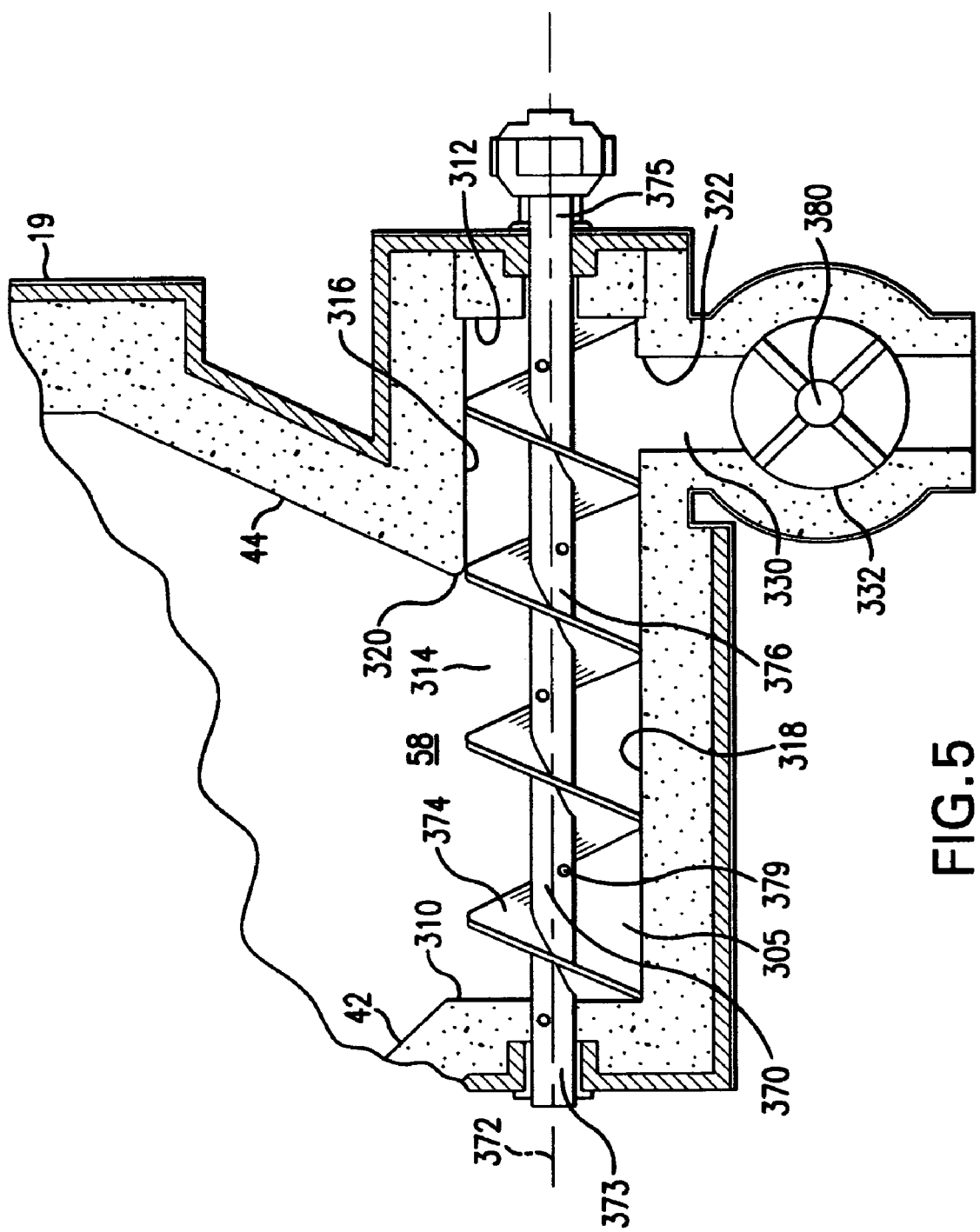
FIG. 5 is a side sectional view of an auger type ash removal assembly used with an all-refractory air-lock and dry bottom ash transport.
Figure 6:
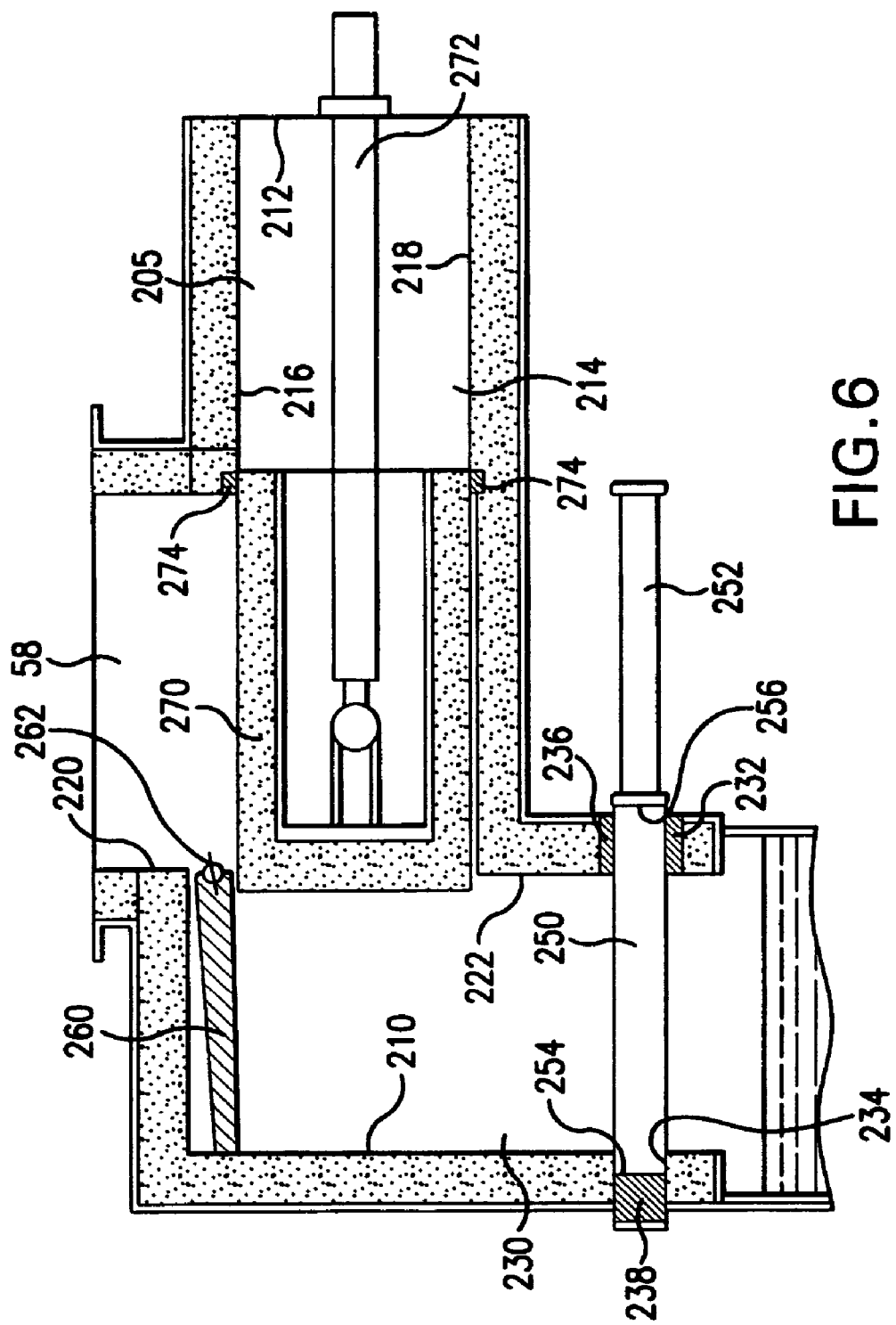
FIG. 6 is a side sectional view of a ram type ash removal assembly used with a wet bottom ash transport, where the piston is in the extended, or first, position and causes the flap to a horizontal open position.
Figure 7:
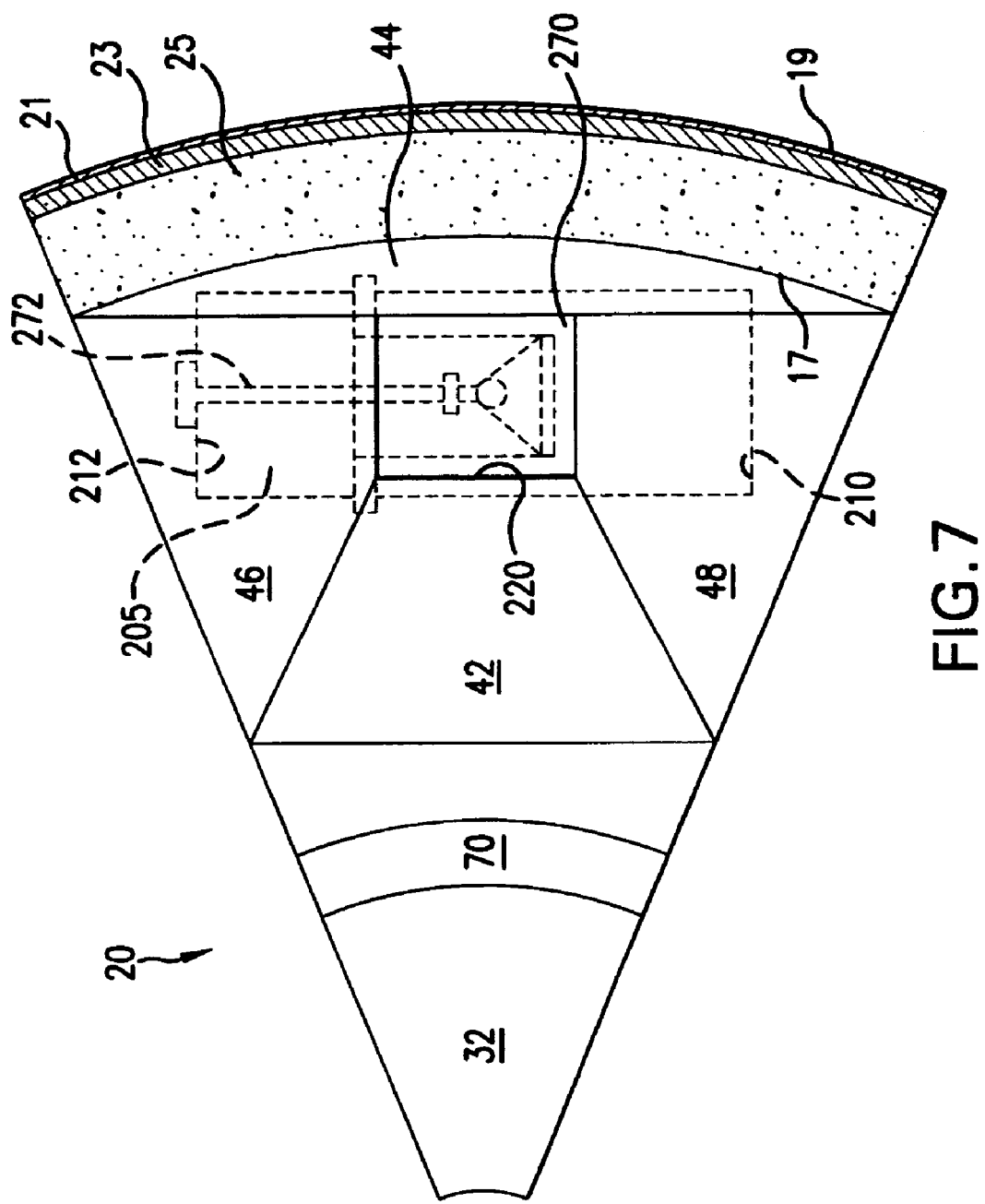
FIG. 7 is a top view of an individual cell from an 8 cell gasifier illustrating the ram type ash removal assembly in place below the fuel collection hopper, where the piston is in the extended position within a channel oriented tangentially to the sidewall of the gasifier.

Referring now to FIGS. 3 and 4, fuel collection hopper 40 comprises an downwardly converging duct having the shape of an inverted pyramid, and includes upper edge 50, lower edge 52, inner face 42, outer face 44, first lateral face 46, and second lateral face 48. Upper edge 50 of fuel collection hopper 40 forms a closed, four-sided shape. The first pair of opposing sides of the four-sided shape corresponds to the upper peripheral edge of respective first and second lateral faces 46, 48, and are divergent. The second pair of opposing sides of the four-sided shape corresponds to the upper peripheral edge of respective inner and outer faces 42, 44, and are arcuate and equidistant at every point. Lower edge 52 of fuel collection hopper 40 corresponds to the lower peripheral edge of each respective face 42, 44, 46, 48, and has a rectangular shape. Upper edge 50 is separated from lower edge 52 by the respective downward and inward sloping inner 42, outer 44, first lateral 46, and second lateral 48 faces. The sloped surfaces of inner face 42, outer face 44, first lateral face 46 and second lateral face 48 converge to lower edge 52, lower edge 52 defining a lower opening 58 through which the solid by-products of combustion are removed from gasifier 10. Inner face 42 intersects upper edge 50 along rim section 70. Outer face 44 intersects upper edge 50 along sidewall 14 of gasifier 10. First lateral 46 and second lateral 48 faces are opposed, each extending between inner face 42 and outer face 44.

Rim section 70 of each individual cell comprises a first end 72 adjacent first lateral side 54, and a second end 74 adjacent second lateral side 56. When the plurality of individual cells 20 are joined together along their respective lateral sides 54, 56 to form an annular, segmented furnace bed 16, the respective first end 72 of rim section 70 of a cell 20 confronts and abuts the respective second end 74 of rim section 70' of the adjacent cell 20', forming an annular margin 76 centered on vertical centerline 7 of gasifier 10. Because both feed cone portion 30 and fuel collection hopper 40 are formed of downwardly-angled surfaces, and because annular margin 76 resides between feed cone portion 30 and fuel collection hopper 40, annular margin 76 is positioned above other components of furnace bed 16.

Feed cone portion 30 is a smooth, dense wear-resistant castable refractory feed surface 32 which slopes downward and radially inward from annular margin 76. Feed surface 32 is planar and consists of upper edge 34, lower edge 36, first lateral side edge 37, and second lateral side edge 38. Upper edge 34 of feed surface 32 intersects annular margin 76. Lower edge 36 of feed surface 32 is opposed to upper edge 34, and confronts the opening through which fuel is fed into gasifier 10. First and second lateral side edges 37, 38 of feed surface 32 extend between the respective upper 34 and lower 36 edges. When the plurality of individual cells 20 are joined together along their respective lateral sides 54, 56 so as to form an annular, segmented furnace bed 16, the respective first lateral side edge 37 of feed surface 32 of cell 20 confronts and abuts the respective second lateral side edge 38 of feed surface 32 of the adjacent cell 20', forming a generally conical, downwardly converging fuel feed duct, or feed cone 31, centered on the vertical centerline 7 of gasifier 10.

It is through centrally aligned feed cone 31 that fuel is fed into the gasifier 10. The feed system 1 consists of a fuel metering bin and horizontal and vertical augers that feed the biomass into gasifier 10 at a constant rate so as to maintain the desired pile height. As will be described below with respect to ash removal, ash is continuously removed from fuel collection hopper 40 so that as fuel moves up into the fuel bed 2, is received within fuel collection hopper 40, and gasified, the resultant ash is removed from gasifier 10. This constant flow of material within gasifier 10 prevents bridging of the fuel pile 2.

The angle $\Phi_1$ of feed surface 32 relative to the horizontal is customized to accommodate the particular type of biomass being fed into gasifier 10, to insure that the shape of the surface of fuel pile 2 is elliptical. For example, when burning poultry litter, this angle is preferably 45 degrees. The angles $\Phi_2$ of inner face 42 and $\Phi_3$ of outer face 44 of fuel collection hopper 40 relative to the horizontal are also customized to accommodate the particular type of biomass, and is intended to prevent bridging and sticking along this surface. When burning poultry litter, angles $\Phi_2$ and $\Phi_3$ are preferably 64 and 75 degrees, respectively. It is understood that when other fuels are burned, angles $\Phi_1$, $\Phi_2$ and $\Phi_3$ may be modified to reflect the properties of the fuel and to achieve the proper effect within the furnace bed.

Figure 18:
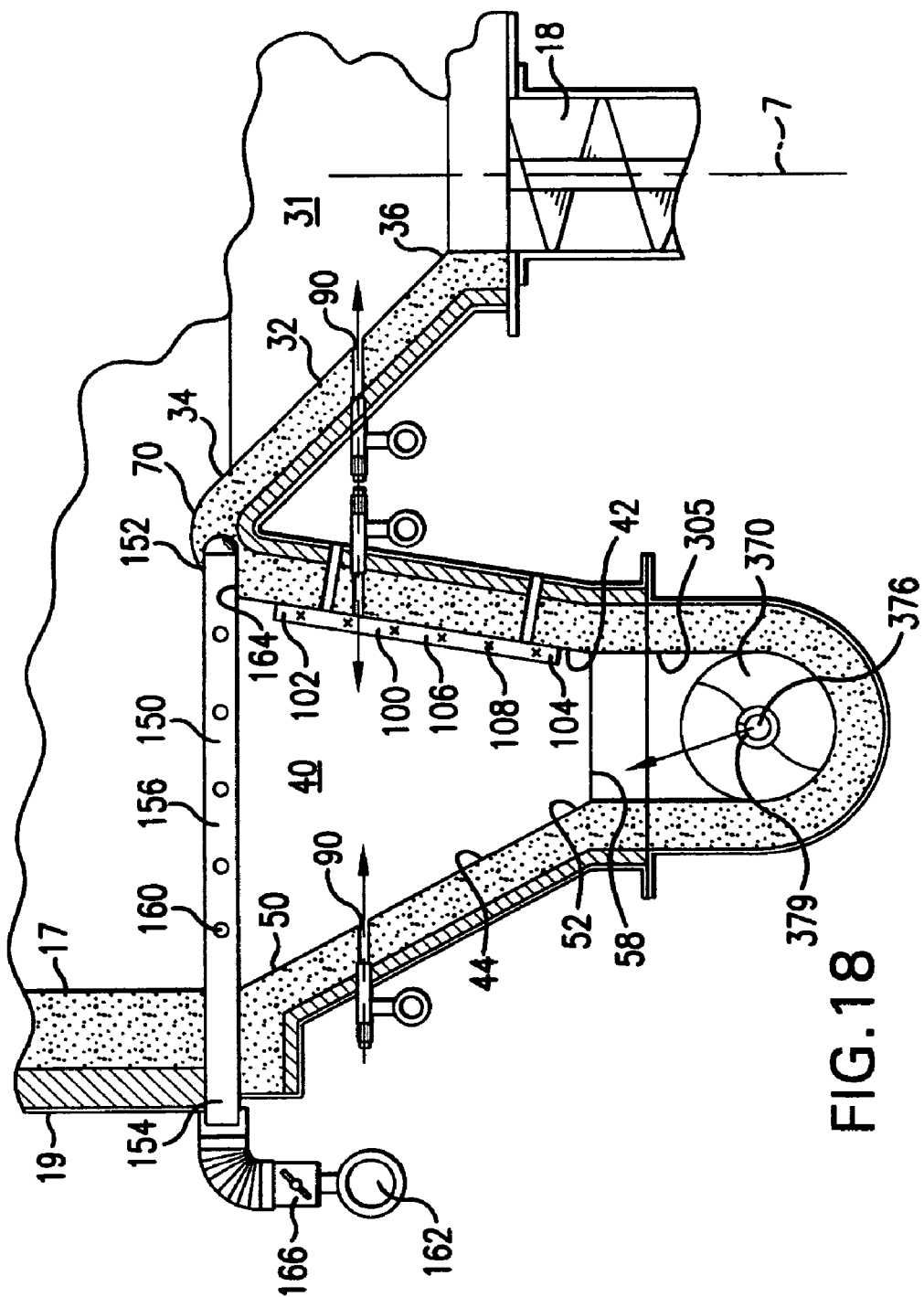
FIG. 18 is a side sectional view of a cell illustrating the connection between a lance and its external manifold, and how the lance is supported by the annular rim within the furnace bed.

Each fuel collection hopper 40 is provided with a temperature sensing tube 100 (FIG. 18) that provides ramped temperature control within each cell. Sensor tube 100 is an elongate hollow rod, the rod having a first end 102, a second end 104 opposed to first end 102, and a body portion 106 which lies between and separates first end 102 from second end 104. Plural thermocouples 108 are embedded in the surface of sensor tube 100 in a linear, spaced apart configuration. In the preferred embodiment, at least three thermocouples are provided on sensor tube 100 so that a thermocouple 108 is positioned at second end 104, and at least two thermocouples 108 are embedded along body portion 106. In the most preferred embodiment, a thermocouple 108 is positioned every 4 to 6 inches along the length of sensor tube 100, so that the size of sensor tube 100, as required by the specific application, determines the number of thermocouples 108 employed. Thus, temperature sensing tube 100 may include six or more thermocouples, depending upon the capacity of gasifier 10.

Sensor tube 100 is provided in a length so that first end 102 resides adjacent to upper edge 50 and second end 104 resides below first end 102, adjacent to lower edge 52 so that the temperature can be measured simultaneously at multiple depths within the cell. In the preferred embodiment, sensor tube 100 is secured to inner face 42 of fuel collection hopper 40.

As the fuel pyrolyzes, the ash cools as it falls through fuel collection hopper 40. By using sensor tube 100, a temperature profile or gradient through the depth of the fuel pile is obtained and can be used to control fuel burn rate, pile height, or both. For example, if the cool layer of ash rises (indicated by a temperature drop) then the fuel feed rate into gasifier 10 can be increased, and or the amount of air injected into fuel pile 2 can be increased. Alternatively, if temperature is increasing at lower levels within fuel collection hopper 40, and the fuel pile height is being maintained, the amount of air injected into fuel pile 2 can be decreased.

A pile height control device 27 is also included on sidewall 14 at an appropriate location. This device can be used in tandem with sensor tube 100, or as a redundant system for emergency purposes. Height control device 27 is preferably laser or optical. A mechanical height control device, as shown in competitor gasifiers, would not be used since they are prone to failure.

Each cell 20 is provided with an ignition stabilizing burner 118 for use in process startup and shutdown. If necessary, burner 118 can also be used to stabilize combustion in an individual cell 20. Once combustion within gasifier 10 has been started, stabilizing burner 118 is rarely active. It is used during process shutdown to maintain required tempertures and prevent volatiles from being created and going out the stack while gasifier 10.

Elimination of tramp air within gasifier 10 and carefully controlled aeration of fuel pile 2 are key elements in the inventive design of gasifier 10. Aeration of fuel pile 2 is achieved using all-ceramic tuyeres 90 strategically placed within furnace bed 16, using all ceramic air injection lances 150 that extend radially through fuel pile 2, or a combination of both tuyeres 90 and lances 150. The determination of how to accomplish optimum aeration is dependent upon the specifics of the application.

Aeration of fuel pile 2 is achieved using a plurality of tuyere arrays 122, 124, 126, 128, 379 positioned about furnace bed 16 (FIG. 3, 5). Each tuyere array is composed of a plurality of all-refractory tuyeres 90 that are preferably provided in a linear, horizontally spaced arrangement. The number of tuyere arrays used and positioning of tuyere arrays within cell 20 is dependent upon the requirements of the specific application. Tuyere arrays may be placed in all, or a subset of, the following locations: A first tuyere array 122 is positioned on inner face 42 of fuel collection hopper 40. A second tuyere array 124 is positioned on outer face 44 of fuel collection hopper 40. Third 126 and fourth 128 tuyere arrays are positioned on respective first and second lateral faces 46, 48 of fuel collection hopper 40. A fifth tuyere array 130 is positioned on feed surface 32 of feed cone portion 30. In the preferred embodiment, the tuyere array is positioned at a height that is midway between upper edge 50 and lower edge 52 of cell 20.

Figure 10:
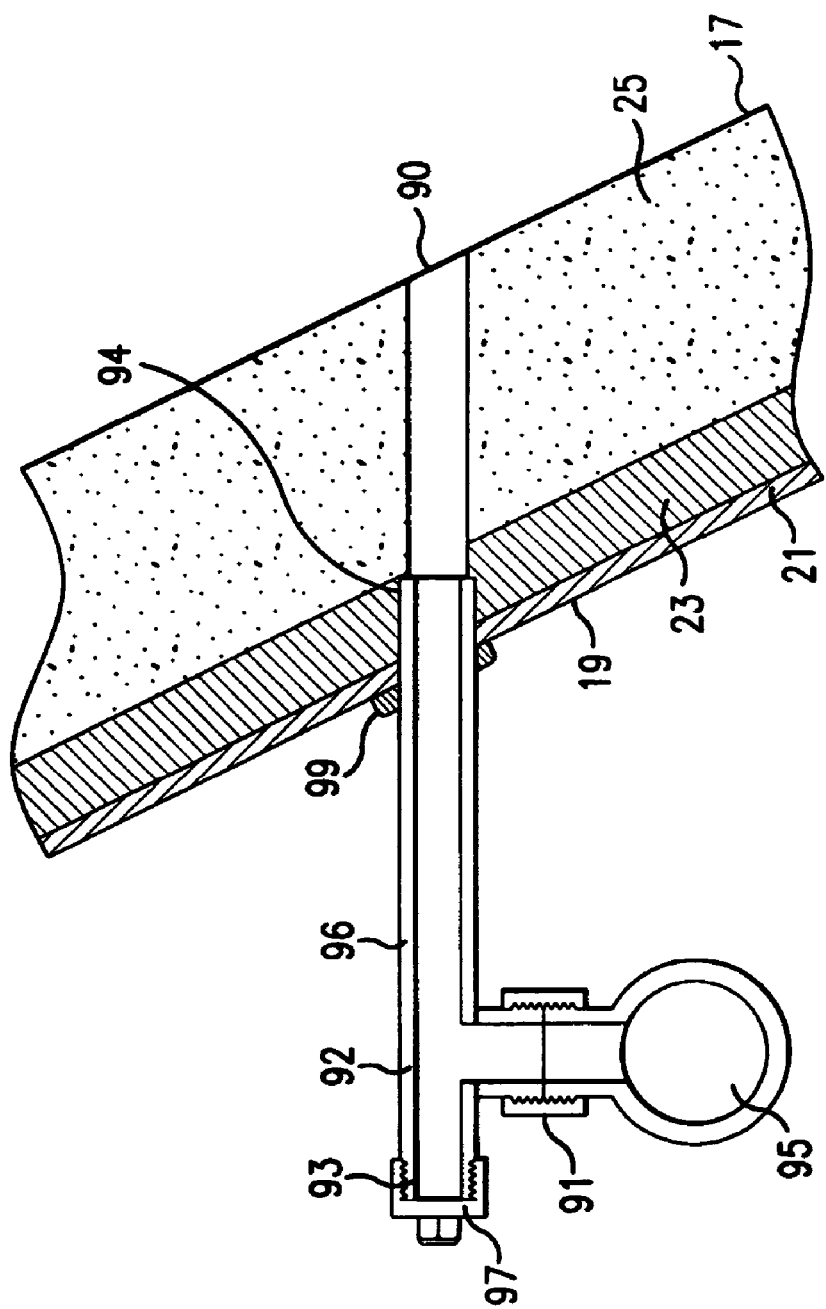
FIG. 10 is a partial side sectional view of the wall of a cell, illustrating a single tuyere and its associated manifold and air supply pipe.
Figure 11:
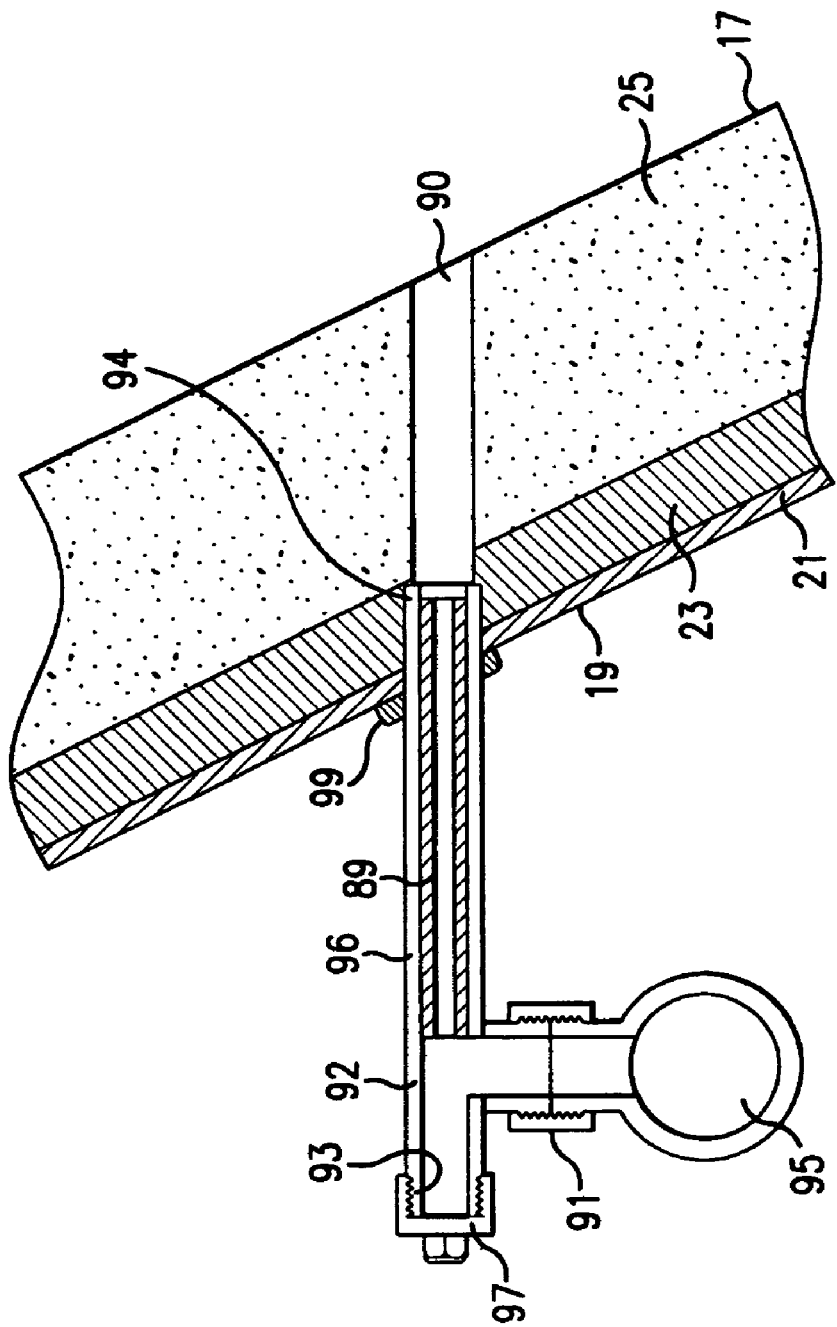
FIG. 11 is a partial side sectional view of the wall of a cell, illustrating a single tuyere and its associated manifold and air supply pipe, with a bushing within the air supply pipe to modify air flow to the tuyere.

Each tuyere 90 (FIGS. 10, 11) is formed in the refractory lining of the furnace bed such that it is oriented at an angle which lies in the range from zero (shown) to 45 degrees downward from the horizontal, and is directed into fuel pile 2 within gasifier 10. Each tuyere 90 comprises an opening within the refractory lining 17 of cell 20 that is in fluid communication with pipe 92.

Pipe 92 has a first end 93 which is external of gasifier 10, a second end 94, and a body 96 which lies between first end 93 and second end 94 and extends through outer shell wall 19 of gasifier 10. Second end 94 of pipe 92 terminates within refractory lining 17 and intersects tuyere 90. Body 96 of pipe 92 is welded 99 to outer shell wall 19.

First end 93 of pipe 92 is provided with a removable cap or plug 97. Cap 97 closes first end 93 during normal use, and can be removed to allow cleanout of pipe 92 and tuyere 90. Additionally, access to first end 93 allows insertion of bushing 89 within pipe 92. Bushing 89 is used to modify air flow from tuyere 90, giving further adjustability to inventive air injection system. Cap 97 is a means for selective closure of the first end so that during normal operation the first end of the pipe is closed and during maintenance of the tuyere, the first end can be opened to allow the pipe and opening to cleaned.

Air flow to the tuyeres 90 is controllable so that air may be injected into fuel pile 2 in a steady flow, and alternatively so that air may be injected in a pulsed flow. Air flow is further controllable so that each tuyere array is controllable independent of the remaining sets of tuyere arrays. The source of air flow for each tuyere array is provided by a manifold 95. Manifold 95 is selectively releasably secured to body 96 of pipe 92 using conventional pipe fittings 91. The external positioning and removability of manifold 95 allow for easy maintenance and replacement of this component.

Figure 17:
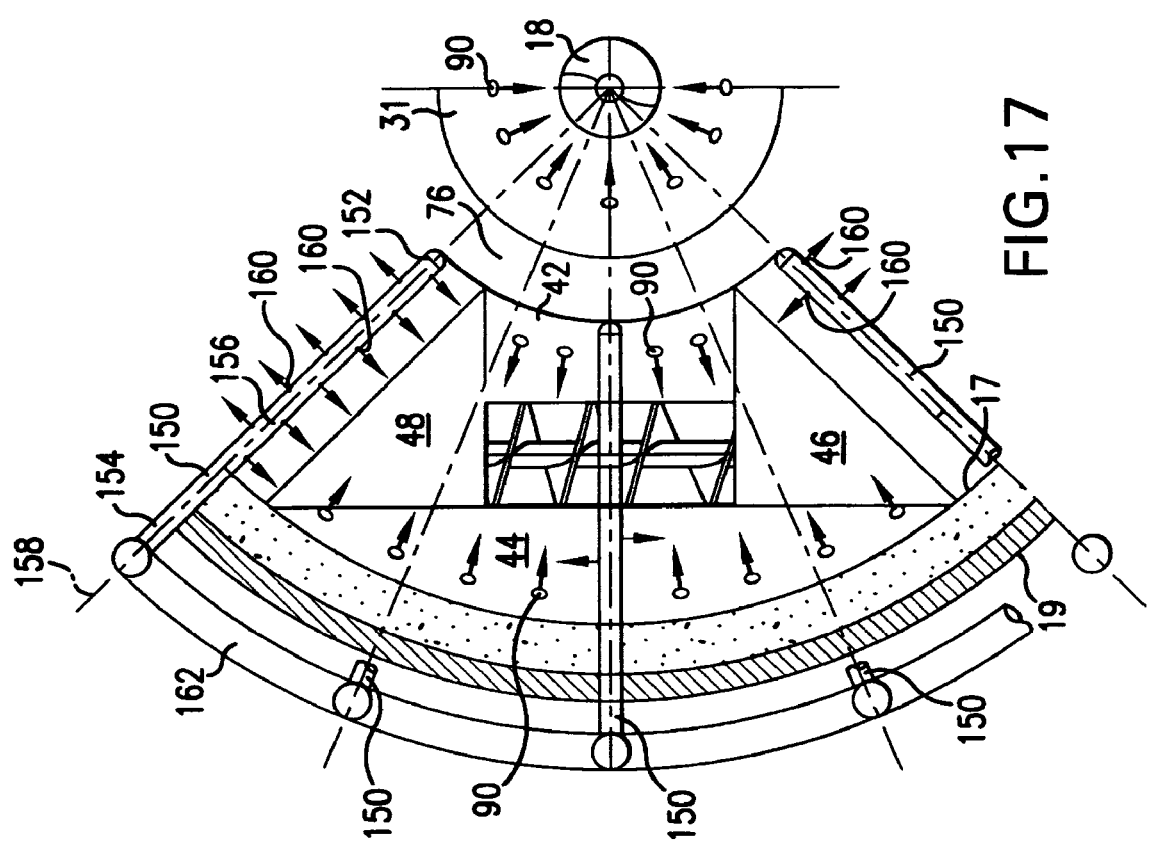
FIG. 17 is a top view of an individual cell of a 4-cell gasifier illustrating the radial alignment of five lances within a cell, where two lances are fully shown, and three lances are partially shown, and illustrating the relationship of the lance to its external manifold.

Aeration of fuel pile 2 is also achieved using at least one all-refractory air injection lance 150 (FIG. 17) in each cell 20. Lance 150 is an elongate hollow tube having a first end 152, a second end 154, a body 156 which separates first end 152 and second end 154, and a longitudinal axis 158 which extend between first end 152 and second end 154. Lance 150 is generally horizontally oriented along upper edge 50 of cell 20, and extends radially between sidewall 14 and annular margin 76. Second end 154 of lance 150 resides externally of gasifier 10, and first end 152 of lance 150 is supported within a shallow opening 164 formed in rim section 70.

Body 156 of lance 150 is provided with plural, horizontally-oriented, spaced-apart holes 160. Holes 160 are in fluid communication with the hollow interior of lance 150 so that when air is propelled from first end 152 to second end 154, the air exits lance 150 through holes 160 and is injected into cell 120.

First end 152 of each lance 150 is in fluid communication with lance manifold 162. Lance manifold 162 resides externally of gasifier 10 and is an annular tube that encircles its outer shell 19. A valve 166 between lance manifold 162 and first end 152 allows selective opening, closure, or adjustment of airflow into lance 150.

Depending on the specific biomass burned within gasifier 10, lance 150 may be stationary, or alternatively, may be movable with respect to cell 20. Lance 150 is capable of longitudinal translations where it is agitated radially within cell 20, and is also capable of longitudinal twisting where it is agitated rotationally about its longitudinal axis 158. Motions may be translations, rotations, both, or neither as required by the requirements of the application. Lance movements are actuated externally of the gasifier, and are accomplished using conventional mechanisms.

The number of lances 150 employed within a given cell 20 is dependent upon the specific biomass burned within gasifier 20, as well as the size of cell 20. Gasifiers employing fewer cells 20 will may require more lances 150 per cell 20 to achieve the required air flow. In all configurations, lances 150 are equidistant and radially oriented in a horizontal plane. If a single lance 150 is used, it is preferably centered between first lateral side 54 and second lateral side 56. If two lances 150 are used, they may be aligned along each respective first lateral side 54 and second lateral side 56. Alternatively, they may be aligned so as to be spaced apart from each other and each respective first lateral side 54 and second lateral side 56. If three lances 150 are used, they may be positioned so that the first lance lies along first lateral side 54, the second lance lies along second lateral side 56, and the third lance is centered between both first lateral side 54 and second lateral side 56. In the preferred embodiment, cell 20 is provided with one, two, three, or five lances 150. However, it is understood that additional lances 150 may be provided if needed.

It is important to note that the fuel's heat content, or heating value, the percentage of moisture and ash, the design percentage of stoichiometric air, and where the air is injected all determine the number of tuyeres, lances, and ash auger ports (described below). Some wastes do not require use of air injected through the ash auger or tuyeres, so that all injected air would be provided using lances. Alternatively, when burning low ash wastes like wood, most air would be provided using tuyeres, and little or no air injection would be provided using the ash auger or lance.

If the fuel is high in moisture content, such as green wood, use of the preheated air enhances the gasification process by driving off volatiles and reducing the amount of air in the gasifier, which, in turn, holds the temperature down and reduces the unwanted combustion of the biomass. When burning dry fuels or fuels high in plastics, preheated air can be sent to the oxidizer and ambient air to the gasifier, resulting in high system thermal efficiency with better combustion control.

Lower edge 52 of each fuel collection hopper 40 defines a rectangular opening 58 through which the solid by-products of combustion are removed from gasifier 10, including ash, clinker, and any non-combusted materials. Ash removal means are positioned directly below and in vertical alignment with opening 58. The preferred means of ash removal includes an all-refractory auger within a generally horizontal, refractory-lined, cylindrical channel. The auger ash removal assembly is well suited for high ash waste removal and for waste that includes plastics, because plastics tend to hot-spot, form clinker, and are sticky. The auger ceramic is dense, gets stronger with increased temperatures, and slagging ash will not stick to it. The auger ash assembly is equally effective in low-ash conditions. An alternative ash removal means can include an all-refractory ash ram within a generally horizontal, refractory-lined channel. The ram ash removal assembly is suited for low ash waste applications only. Both auger and ram ash removal assemblies can empty into wet-bottom drain to maintain an air seal, or alternately, into a guillotine, dual chamber bottom which does not require water for sealing.

The auger ash removal assembly will now be described with respect to FIGS. 5, 8, 12, 17, and 18. Refractory-lined channel 305 is positioned below fuel collection hopper 40. Channel 305 is cylindrical and has a first end 310, a second end 312 that is opposed to first end 310, and a body portion 314 which lies between first end 310 and second end 312. Channel 305 has an upper side 316 which faces the underside of fuel collection hopper 40, and a lower side 318 which is opposed to upper side 316.

A first opening 320 is positioned on upper side 316 of body portion 314 at a location which is adjacent to first end 310. First opening 320 sealingly abuts, confronts, and is in vertical alignment with lower opening 58 of fuel collection hopper 40. A second opening 322 is positioned on lower side 318 of body portion 314 at a location which is adjacent to second end 312. Vertically oriented, elongate, refractory-lined channel extension 330 is a drain shaft that intersects lower side 318 of the channel 305 at second opening 322.

In the preferred embodiment, channel extension 330 is provided with an enlarged region which houses air lock 380. Air lock 380 is formed of all-refractory materials so that it can accommodate the high temperature solid by-products of combustion. Air lock 380 transfers the solid by-products of combustion through channel extension 330 to the exterior of gasifier 10 while maintaining it air seal. Below air lock 380, channel extension 330 opens into a sump 382 which is common to the ash removal assembly of adjacent cell 20'.

Auger 370 is an all-refractory, elongate, hollow tube 376 having an all-refractory helical blade 374 extending radially outward from tube 376. Auger 370 has a first end 373 which terminates within first end 310 of channel 305, and a second end 375 which terminates within second end 312 of channel 305. Longitudinal axis 372 of auger 370 is aligned with the longitudinal axis of channel 305.

Figure 8:
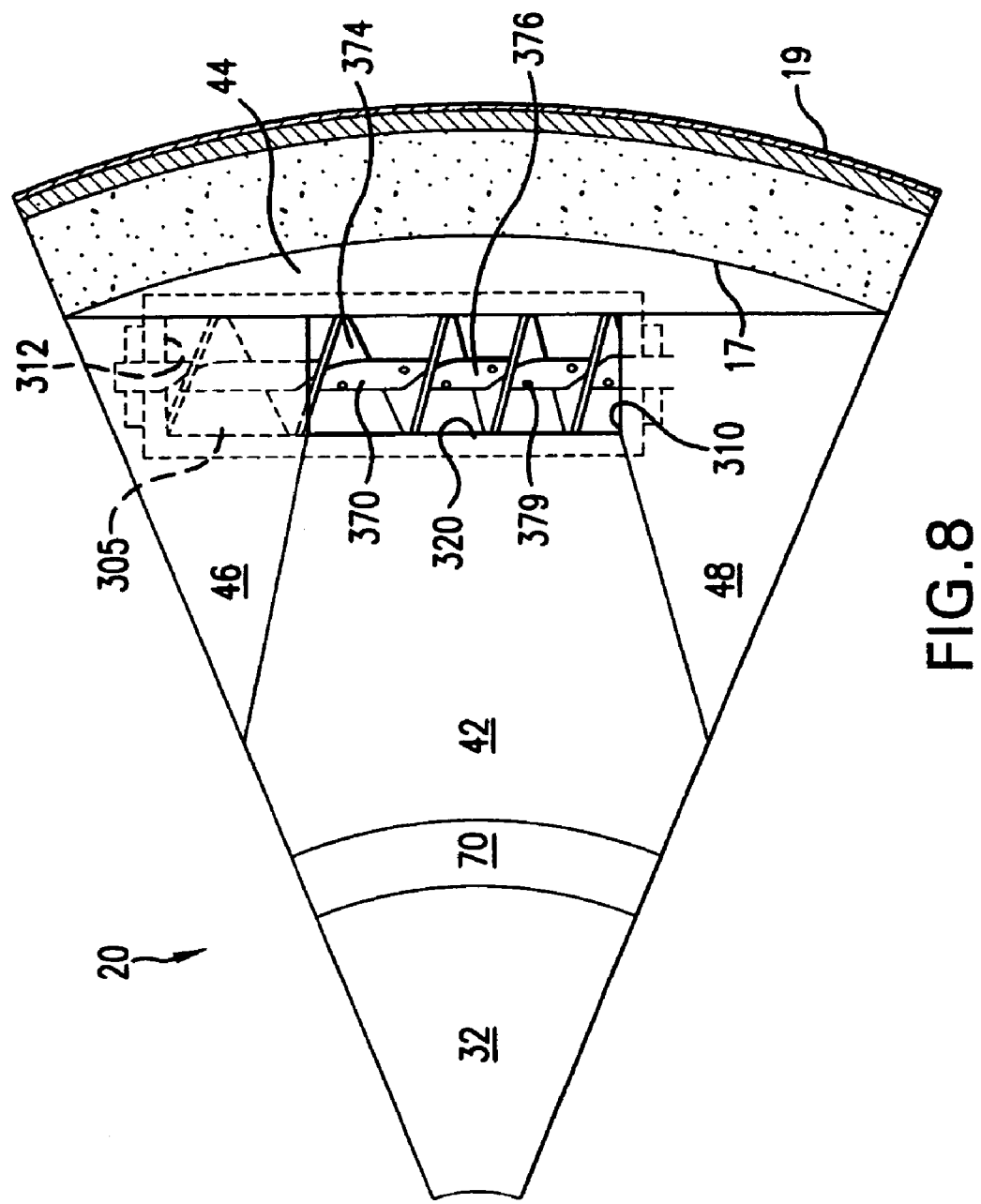
FIG. 8 is a top view of an individual cell from an 8-cell gasifier illustrating the auger type ash removal assembly in place below the fuel collection hopper, where the auger is longitudinally aligned within a channel which is oriented tangentially to the sidewall of the gasifier.
Figure 9:
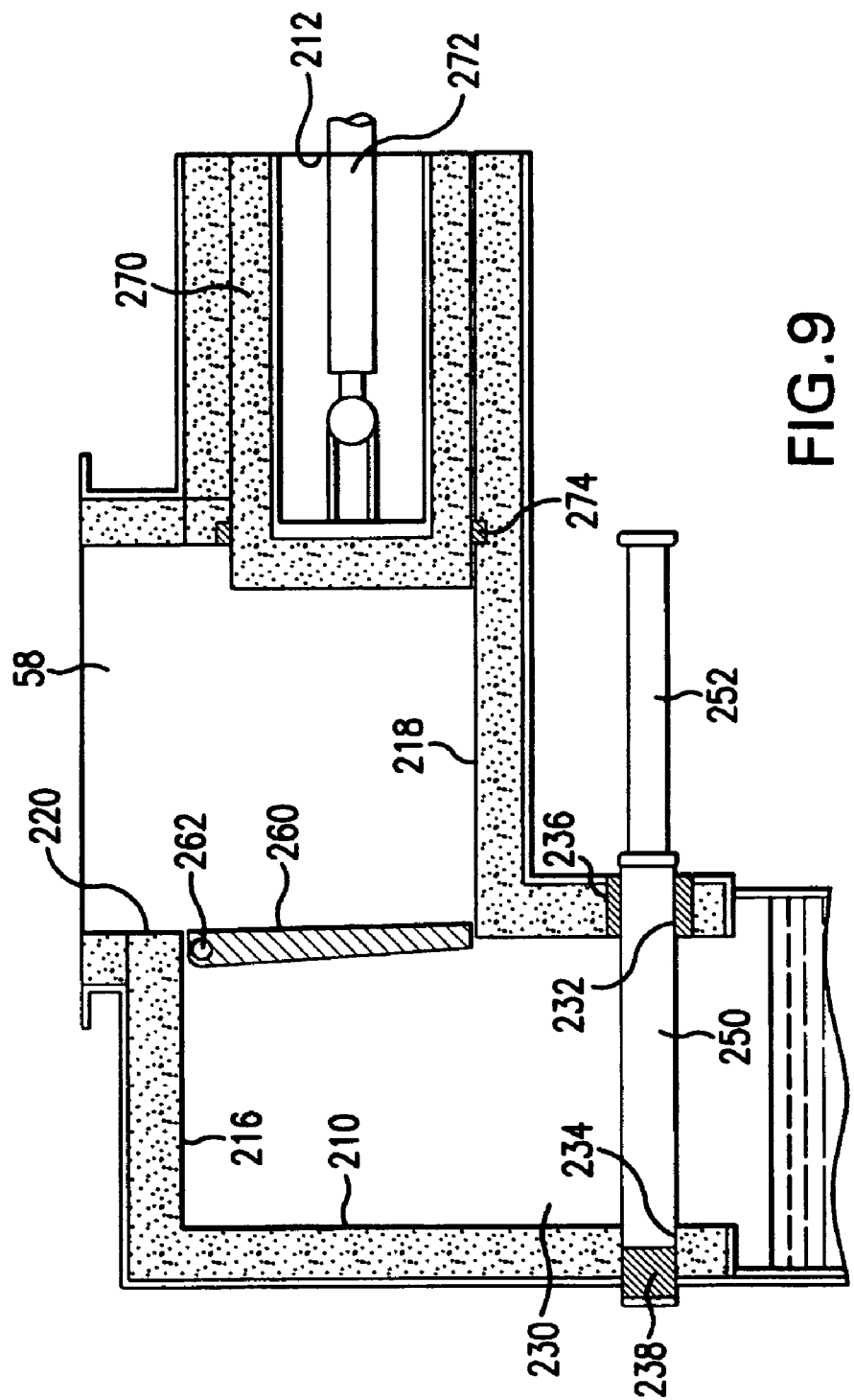
FIG. 9 is a side sectional view of a ram type ash removal assembly used with a wet bottom ash transport, where the piston is in the retracted, or second, position allowing the flap to hang in a vertical closed position.

Helical blade 374 of auger 370 has an outer diameter sized and shaped to fit closely within channel 305. In the preferred embodiment, helical blade 374 is provided with a graduated pitch such that the spacing of the flights of the helical blade at its first end 373 are a shorter distance than the spacing of the flights of the helical blade at second end 375 (FIG. 8). This increase in flight spacing adjacent the ash discharge ensures that the fuel pile 2 is generally level. However, it is within the scope of this invention to employ an auger having uniform pitch.

Tube 376 of auger 370 is hollow, and is provided with a plurality of openings 379 that extend between its hollow interior and the exterior. Openings 379 are positioned about tube 376 between blades 374. When desired, air is introduced in the hollow interior, and exits tube 376 from opening 379 so as to inject air into the underside of fuel pile 2.

Figure 12:
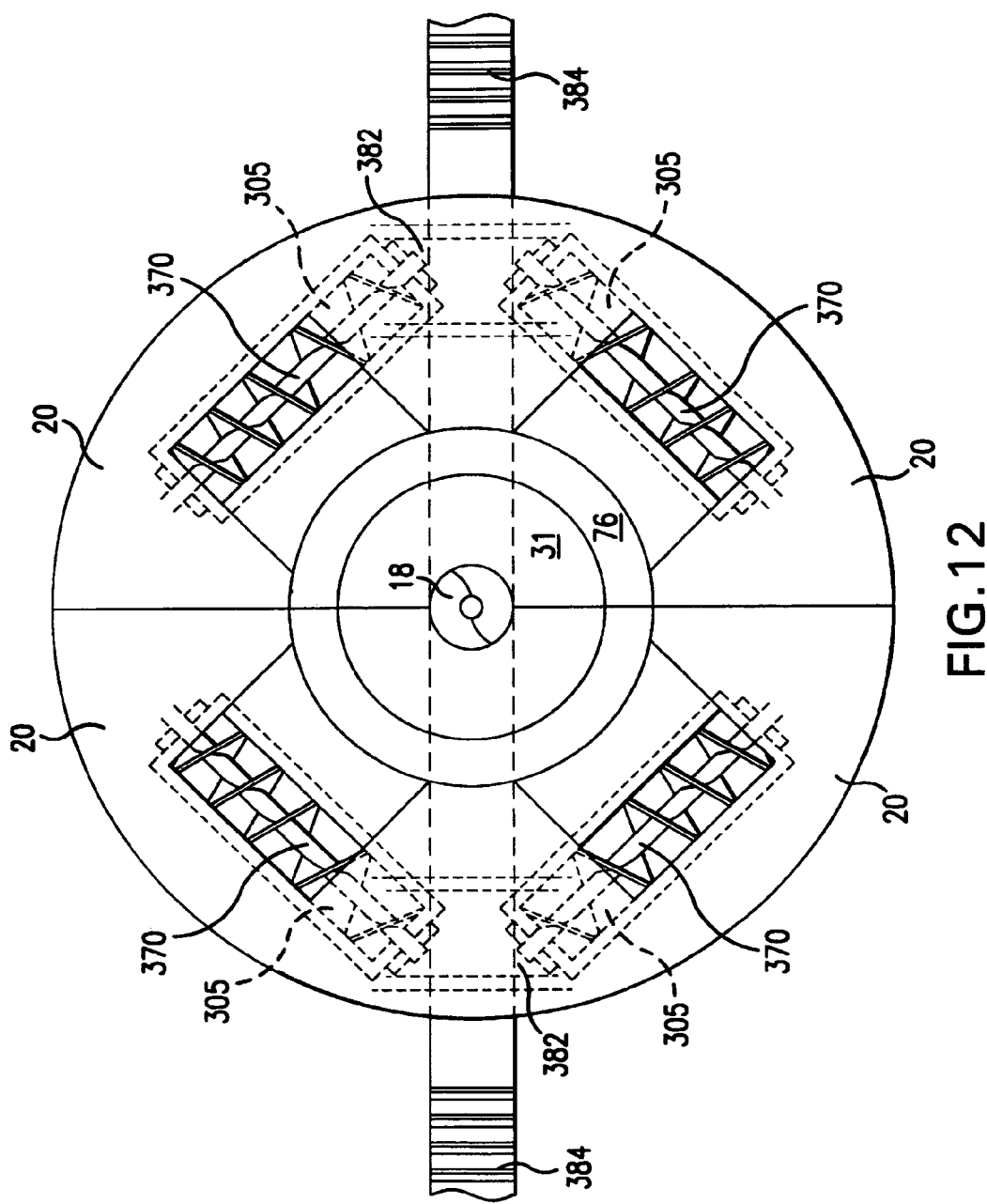
FIG. 12 is a top sectional view of the furnace bed of a 4-cell gasifier across where phantom lines show how ash removal transport channels intersect in a pairwise manner at a common sump downstream of the fuel collection hopper. Ash is removed from the common sump using an ash auger.
Figure 13:
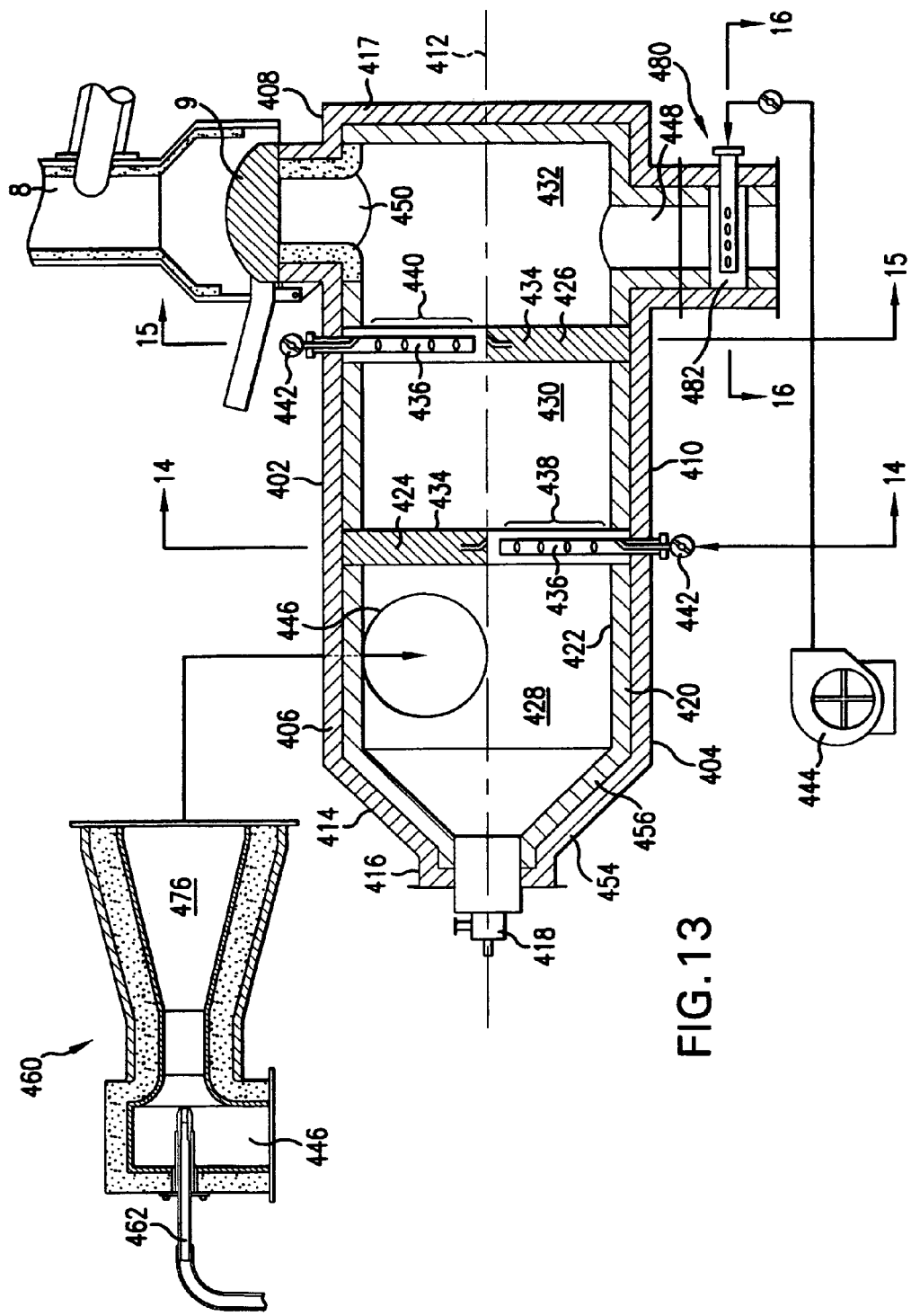
FIG. 13 is a side sectional view of the oxidizer illustrating the three serially-aligned stages defined by transverse baffles, the combustion air injection assembly at the inlet duct, and the tempering air manifold at the outlet duct.

When in use, auger 370 rotates about longitudinal axis 372 within channel 305, causing by-products of fuel combustion from fuel collection hopper 40 to be propelled at a graduated rate from first end 310 of channel 305 to its second end 312 where it falls into channel extension 330, is discharged through air lock 380, and is received within common sump 382 (FIG. 12).

The ram ash removal assembly will now be described with respect to FIGS. 4, 6, 7, and 9. Refractory-lined channel 205 is positioned below fuel collection hopper 40. Channel 205 has a first end 210, a second end 212 that is opposed to first end 210, and a body portion 214 which lies between first end 210 and second end 212. Channel 205 has an upper side 216 which faces the underside of fuel collection hopper 40, and a lower side 218 which is opposed to upper side 216.

A first opening 220 is positioned on upper side 216 of body portion 214 at a location which is spaced apart from each respective first and second end 210, 212. First opening 220 sealingly abuts, confronts, and is in vertical alignment with lower opening 58 of fuel collection hopper 40. A second opening 222 is positioned on lower side 218 of body portion 214 at a location which is adjacent to first end 210. Vertically oriented, elongate, refractory-lined channel extension 230 is a drain shaft that intersects lower side 218 of the channel 205 at second opening 222.

A refractory piston 270 resides within channel 205 and is used to propel the by-products of combustion, which enter channel 205 via first opening 220, along channel 205 to second opening 222, through which it is discharged from the gasifier. Piston 270 has a cross section sized and shaped to closely fit within and slide longitudinally along channel 205. In the preferred embodiment, channel 205 and piston 270 have a sectional shape which in which the upper half is rectangular and the lower half is hemispherical. However, it is within the scope of this invention to provide these elements 205, 270 in other shapes such as polygonal or circular. Piston 270 has a length which longer than the longitudinal length of first opening 220, and is actuated using externally positioned, conventional activation mechanisms 272.

Piston gasket ring 274 is circumferentially embedded in the wall of channel 205 between first opening 220 and second end 212 of channel 205 at a position where it is always in contact with the outer surface of piston 270. Piston gasket ring 274 abuts and confronts the peripheral surface of piston 270 regardless of the longitudinal position of the piston within the channel so as to provide an air seal about piston 270 between first opening 220 and second end 212 of channel 205.

A pivoting refractory flapper 260 is hingedly secured to upper side 216 of channel 205 between first end 210 and first opening 220 such that it is positioned immediately adjacent to first opening 220. Flapper 260 is provided with a cross section sized and shaped to provide a sealing fit within within channel 205. Flapper 260 is transversely oriented within the channel so as to provide a barrier between the first opening and the first end of the channel when the piston is in the second position (described below), and so as to be urged to an open, generally horizontal orientation adjacent to and in parallel with the upper side of the channel when the piston is in the first position (described below).

In use, piston 270 reciprocates between a first position within channel 205 and a second position within channel 205. When in the first position, piston 270 resides generally midway between the respective first 210 and second 212 ends of channel 205, lying directly below first opening 220 so that first opening 220 is completely obstructed by the piston, and so that all by-products of combustion have been urged into channel extension 230. When in the second position, piston 270 resides generally adjacent to second end 212 of channel 205 so that first opening 220 is completely unobstructed by piston 270 and the by products of combustion are permitted to fall from fuel collection hopper 40 through first opening 220 and into channel 205.

Channel extension 230 is provided with a selectively closable means for sealing air which includes a slide gate 250 and associated gasketing 236, 238. Slide gate 250 is an all-refractory plate which, when closed, extends generally horizontally through channel extension 230. Slide gate 250 is movable through slit 232 in the wall of channel extension 230, and is supported within groove 234 formed in the opposing wall. Slide gate 250 is extended and retracted through channel 230 using externally positioned, conventional activation mechanisms 252. Gasket 236 surrounds slide gate 250 within slit 232 to prevent air leakage at this location. Gasket 238 is used within groove 234 as a shock absorber when receiving the leading edge of slide gate 250 therein.

When closed, leading edge 254 of slide gate 250 is supported in groove 234, trailing edge 256 of slide gate 250 resides externally of channel extension 230, and air and material flow through channel extension 230 is completely obstructed by slide gate 250. When opened, slide gate 250 is retracted through slit 232 so that leading edge 254 is positioned within slit 232 and the remainder of slide gate 250 is positioned externally of channel extension 230. This configuration permits unobstructed flow through channel extension 230. Below slide gate 250, channel extension 230 opens into a sump 282 which is common to the ash removal assembly of adjacent cell 20'.

When piston 270 is in the first position (FIG. 6), flapper 260 is urged upwards, and then slide gate 250 is opened to allow ash to fall to common sump 282. When piston 270 is in the second position (FIG. 9), flapper gate 260 returns to a vertical orientation so as to prevent ash from entering channel extension 230, and slide gate 250 is closed, sealing channel extension 230.

All-refractory Oxidizer

Referring now to FIGS. 13–16, the inventive cyclonic, staged oxidizer 3 will now be described. Oxidizer 3 is an elongate, hollow, cylindrical body having a first end 406, a second end 408 opposed to first end 406 and separated from it by a mid portion 410. Longitudinal axis 412 extends from first end 406 to second end 408. In use, longitudinal axis 412 is oriented generally horizontally, and oxidizer 3 has an upper side 402 and a lower side 404. Oxidizer 3 consists of a steel outer shell 454 which is completely lined 456 with refractory material. All internal components, described below, are also formed of refractory material.

First end 406 of oxidizer 3 is provided with a conical endwall 414 that terminates in an apex 416. Apex 416 houses the ignition and stabilizing burner 418. Second end 408 is provided with a generally flat endwall 417. Mid portion 410 includes a cylindrical sidewall 420 that has refractory interior surface 422. Extending in a direction normal to interior surface 422 are first baffle 424 and second baffle 426. First baffle 424 and second baffle 426 extend radially inward from interior surface 422 of sidewall 420 in a spaced relationship both from each other and from respective first and second ends 406, 408. This spaced relationship segments the interior space into a first stage 428, a second stage 430, and a third stage 432. The respective first, second and third stages 428, 430, 432 are serially aligned along longitudinal axis 412 of oxidizer 3 such that first stage 428 resides between the first end 406 and the first baffle 424, second stage 430 resides between first baffle 424 and second baffle 426, and third stage 432 resides between second baffle 426 and second end 408.

First baffle 424 (FIG. 14) and second baffle 426 (FIG. 15) each consist of a circular plate 434. Circular plate 434 has a first area, and a radius which is the same as the interior radius of sidewall 420. Circular plate 434 is provided with a circular opening 436. Circular opening 436 has a second area that is approximately one-third of the first area. Thus, the baffles 424, 426 obstruct two-thirds of the area of plane in which they lie, forcing air flow through circular opening 436. Circular opening 436 is positioned adjacent sidewall 420 such that a portion of the peripheral edge of circular opening 436 coincides with both a portion of the peripheral edge of circular plate 434 and sidewall 420.

Figure 14:
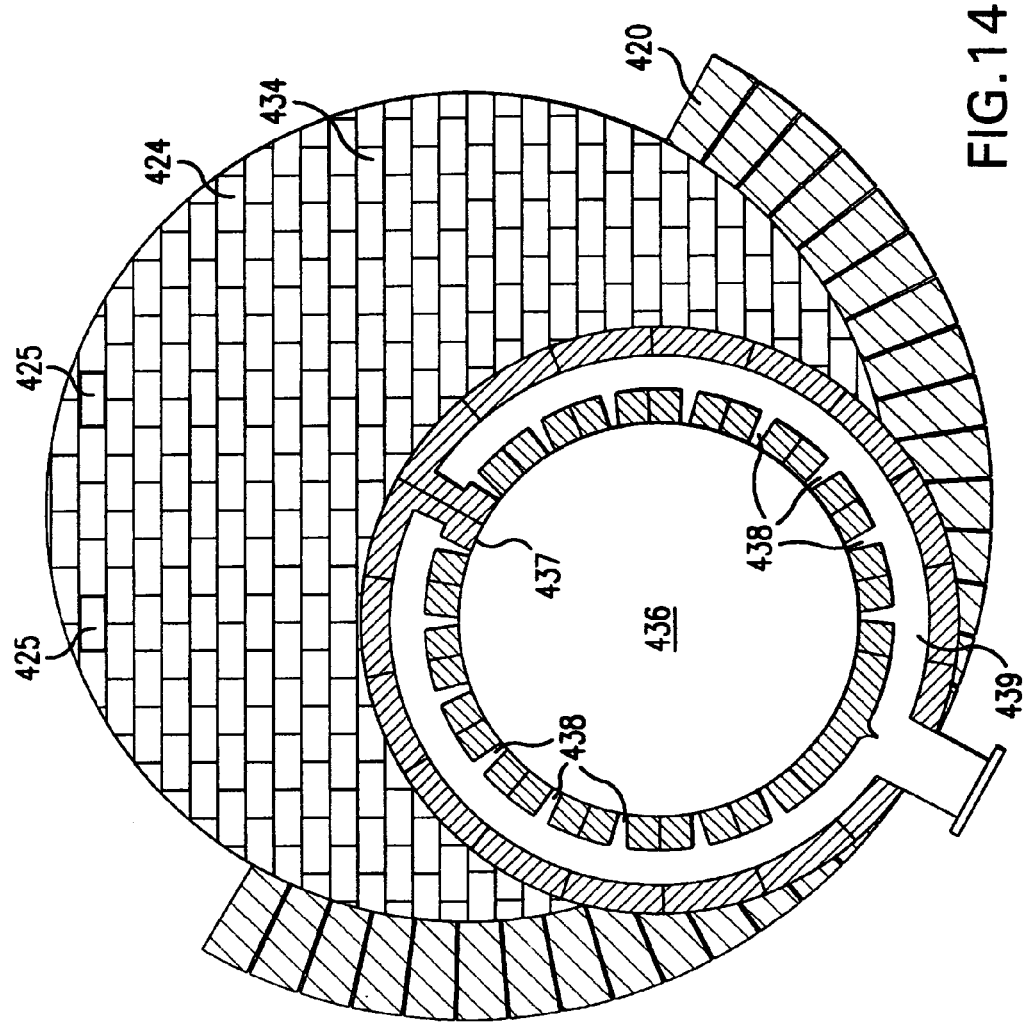
FIG. 14 is a sectional view across line 14—14 of FIG. 13 illustrating the position of the circular opening in the first baffle and the tuyeres about the peripheral edge of the circular opening.
Figure 15:
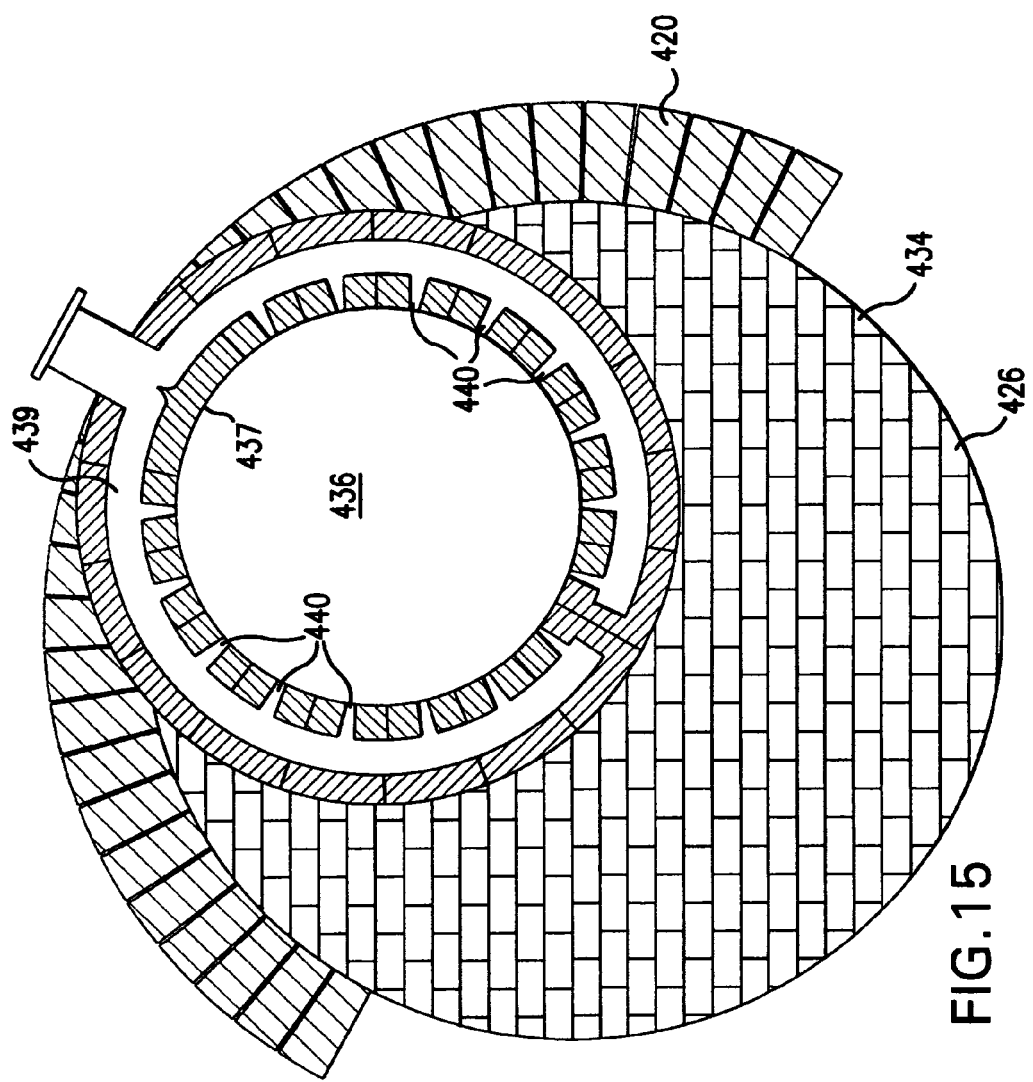
FIG. 15 is a sectional view across line 15—15 of FIG. 13 illustrating the position of the circular opening in the second baffle and the tuyeres about the peripheral edge of the circular opening.
Figure 16:
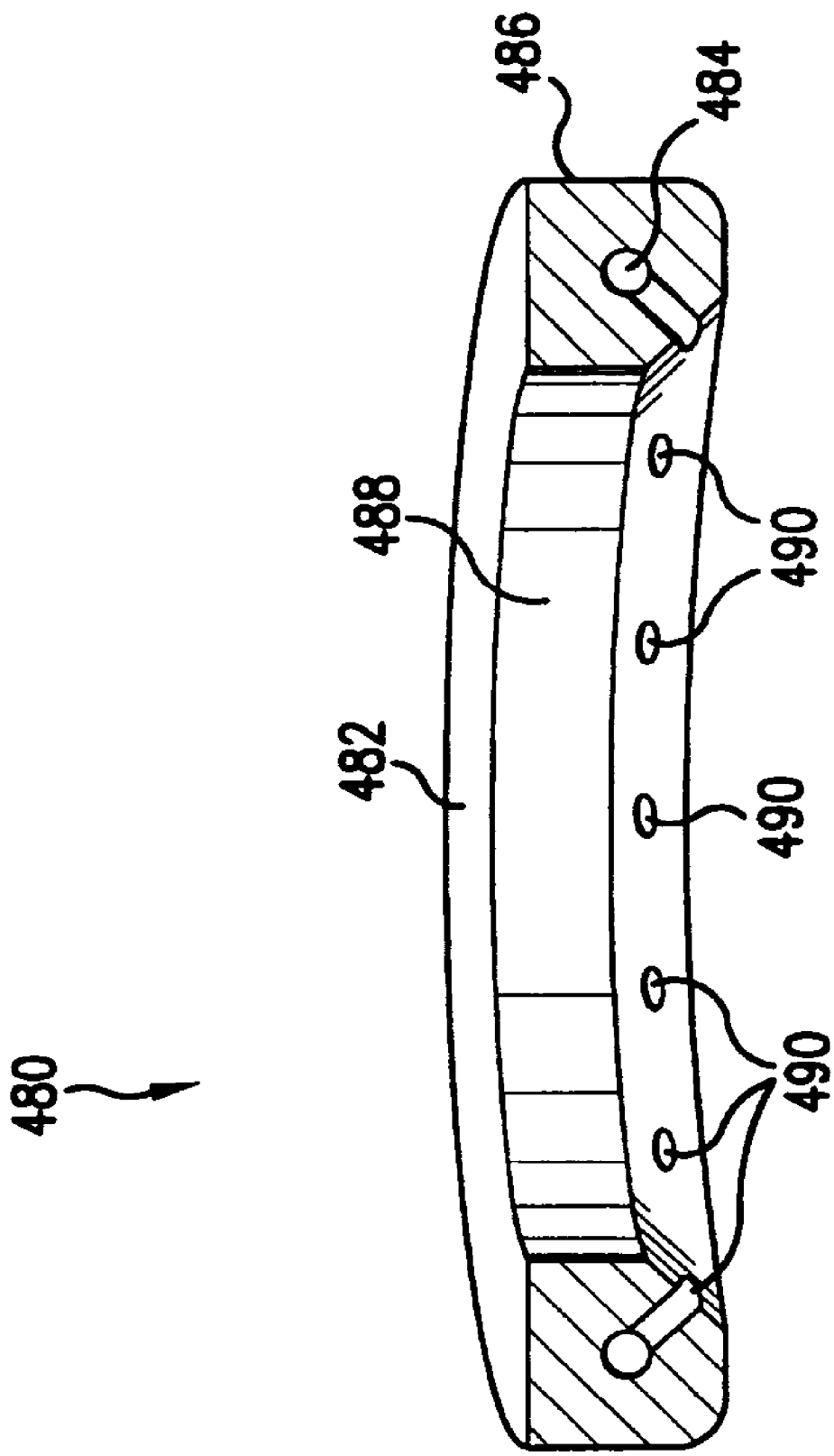
FIG. 16 is perspective sectional view across line 16—16 of FIG. 13 illustrating the ring nozzles on the beveled portion of the inner peripheral surface of the ring and their relationship with the hollow interior of the ring.

In the preferred embodiment, first baffle 424 extends from sidewall 420 on a first side of mid portion 410 and second baffle 426 extends from sidewall 420 on a side which is opposed to the first side, causing fluid flow through the oxidizer to travel a helical or cyclonic path about longitudinal axis 412. In the most preferred embodiment, as shown in FIGS. 14 and 15, first baffle 424 extends from upper side 402 of sidewall 420 such that its circular opening 436 resides adjacent lower side 404. Second baffle 426 extends from lower side 404 such that its circular opening 436 resides adjacent upper side 402.

The peripheral edge 437 of the circular opening 436 of each respective baffle 424, 426 is provided with an array of tuyeres 438, 440. The tuyeres within these arrays 438, 440 are spaced apart in linear alignment along peripheral edge 437 and angled to enhance the cyclonic action of the air flow through oxidizer 3. Each baffle 424 and 426 has an annular vacancy 439 surrounding circular opening 436. Vacancy 439 is in fluid communication with its respective tuyere array 438, 440, and provides the air source for tuyeres 438, 440.

First baffle 424 is provided with small vent holes 425 that extend through its circular plate 434. Vent holes 425 lie adjacent upper side 402 of oxidizer 3 so as to prevent pocketing of gas during oxidizer start up and shut down. It is understood that when a baffle 426 is oriented as shown in FIG. 15 where circular opening 436 is adjacent upper side 402, vent holes 425 are unnecessary.

Fluid inlet duct 446 conveys partial primary combustion (dirty) gases from gasifier 10 to oxidizer 3, and intersects sidewall 420 within first stage 428. Fluid inlet duct 446 intersects sidewall 420 between upper side 402 and lower side 404 such that fluid inlet duct 446 is oriented generally horizontally and generally transverse to longitudinal axis 412 of oxidizer 3. Fluid outlet duct 448 conveys oxidized (clean) gases out of oxidizer 3 and intersects sidewall 420 within third stage 432. Fluid outlet duct 448 intersects sidewall 420 at lower side 404 such that fluid outlet duct 448 is oriented generally vertically and generally transverse to longitudinal axis 412 of oxidizer 3. Emergency relief duct 450 is provided in sidewall 420 the third stage 432 for selective acute release of fluid from oxidizer 3, emergency relief duct 450 including an emergency relief valve 9 that, when activated, allows release of fluid to the atmosphere via stack 8. Emergency relief duct 450 intersects sidewall 420 at upper side 402 such that emergency relief duct 450 is oriented generally vertically and generally transverse to longitudinal axis 412 of oxidizer 3.

Oxidizer 3 includes a high temperature ejector assembly 460 within fluid inlet duct 446, adjacent sidewall 420. High temperature ejector assembly 460 consists of a ceramic air injection tube 462 which is adjustably positionable within a fixed, insulated ceramic guide pipe 478 adjacent an all-ceramic venturi section 447 formed in inlet duct 446.

Air injection tube 462 is an elongate, all-refractory hollow tube. Tube 462 has a first end 464, a second end 466 opposed to first end 464, and a mid portion 468 between first end 466 and second end 468. First end 464 resides externally of fluid inlet duct 446. Second end 466 and mid portion 468 of tube 462 resides within guide pipe 478, which in turn resides within fluid inlet duct 446 such that tube 462 lies generally centered within and aligned with fluid inlet duct 446. Second end 466 of tube 462 terminates in a tapered ceramic nozzle 470. Tapered nozzle 470 is in fluid communication with the hollow interior of tube 462 so that when air is propelled within the hollow interior of tube 462 from first end 464 to second end 466, air is injected into venturi section 447 of fluid inlet duct 446 via nozzle 470.

Guide pipe 478 is fixed to and extends from fluid inlet duct 446. Guide pipe 478 supports air injection tube 462 within fluid inlet duct 446, and provides a protective covering for air injection tube 462 within fluid inlet duct 446. This protective covering is used to prevent slag formation on air injection tube 462 which can occur due to the temperature differential between the air injection tube and the combustion flue gas stream. Guide pipe 478 has an insulated core to minimize its temperature differential with the combustion flue gas stream.

Venturi section 447 is an all-ceramic duct having a constricted portion 472 followed by a diverging portion 476. Diverging portion 476 is relatively long compared to constricted portion 472, allowing recovery of pressure loss. The angle of divergence is critical to the creation of draft within gasifier 10, and is custom designed for the particular process used based on the required draft, the amount of air put in, and the amount of fluid being induced. Nozzle 470 is positioned within inlet duct 446 upstream of, and adjacent to, constricted portion 472, this position being adjustable toward and away from constricted portion 472.

This configuration allows mixing of gases within the flame envelope, rather than using peripheral tuyeres in the first stage as shown in prior art patents. High temperature ejector assembly 460 is critical to completing the combustion within oxidizer 3 with minimal NOx formation, and getting good mixing to burn off CO, hydrocarbons, and VOCs.

Air flows through nozzle 470 inducing flue gas flow through duct 446, and allows creation of a negative draft within gasifier 10. The amount of draft generated is controlled by adjusting the position of nozzle 470 in and out of venturi section 447 of duct 446, as well as by adjusting the air pressure through nozzle 470. The ability to create and control a negative draft at this location within the system is an important safety feature. During normal function of the system, an ID fan 11 located downstream of the heat exchangers 4, 6, generates the negative draft for the system. However, during a system upset which causes ERS 9 to be employed, the negative draft for the system is dissolved. The adjustable air induction feature in high temperature ejector assembly 460 maintains the negative draft within gasifier 10 any time the draft downstream of gasifier 10 is not negative, such as during a system upset. All-ceramic construction of high temperature ejector assembly, duct 446, as well as gasifier 10, oxidizer 3, and heat exchanger 4 makes the system components impervious to heat damage, chemical attack, and able to shed any slag or clinker formation.

Oxidizer 3 includes a tempering air manifold 480 (FIG. 16) within fluid outlet duct 448, adjacent sidewall 420.

Tempering air manifold 480 permits adjustment of the temperature of fluids exiting oxidizer 3 while maintaining a constant mass flow. Tempering air manifold 480 consists of an all-refractory ring 482 that resides about the interior surface of fluid outlet duct 448. Ring 482 has a hollow interior 484, an outer peripheral surface 486 which confronts the interior surface of fluid outlet duct 448, and an inner peripheral surface 488 which is opposed to outer peripheral surface 486 and faces the centerline of fluid outlet duct 448. The lower edge of inner peripheral surface 488 is beveled, and is provided with a plurality of ring nozzles 490. Ring nozzles 490 are in fluid communication with hollow interior 484 of ring 482 such that when air is propelled within hollow interior 484, air is injected into fluid outlet duct 448 via the plurality of ring nozzles 490. Each ring nozzle 490 has an angled orientation within ring 482. This angled air flow from nozzles 490 promotes mixing with fluids exiting from oxidizer 3, and directs them downstream and away from oxidizer 3.

Induced draft (ID) fans 11 maintain a negative pressure in the system. This is important as a safety feature as it allows system doors to be opened while operating without danger of system heat energy venting through the doors. In addition, by placing ID fans 11 in strategic locations such as a cold zone, the ID fans 11 overcome the pressure drops which occur within the heat exchanger 4, 6 and external combustion engine 29, making the systems less expensive to operate. High temperature ejector assembly 460, described above, maintains a negative draft within gasifier 10 in the event of a system upset, such as when the emergency relief stack 9 is employed.

The Emergency relief stack (ERS) 9 is a conventional element used as a safety feature in conjunction with the oxidizer 3. ERS 9 provides a natural draft and releases excess heat energy to protect downstream equipment in cases of system shutdown and/or failure. When the system is configured as in FIG. 22 where oxidizer 3 is not included, ERS 9 is not required and can be replaced with a conventional stack and an ID fan 11.

The inventive gasifier 10 and oxidizer 3 are factory fabricated in modular form to reduce both fabrication and assembly costs, for ease of manufacture and assembly, and to produce a better quality product than field constructed counterparts. Conventional gasifiers are typically completely field-constructed, with associated labor costs due to construction and assembly, and with variability in conditions which lead to poor quality control. Gasifier 10 can be broken down into plural individual cells, a main furnace shell and a completely lined dome, which are constructed in factory conditions to insure air-tight, high-tolerance modules that are sized to be light enough to ship to the desired site. Upper portions of sidewall 14 and dome 12 are insulated and lined with a light weight refractory as described above. This insulation results in a significant reduction in weight when compared to competitive designs that use hard brick or dense castables. This reduction in weight is key to allowing shipping of modular units. Oxidizer 3 can be shipped as one lined section or two, depending on the overall gross heat release that sizes the unit.

External Combustion Engine

The system used to pyrolyzing biomass 2 or other solid waste described above can be configured to produce energy extremely efficiently by including at least one external combustion engine 29 in the system. The preferred external combustion engine 29 is a commercially available heat engine that employs a gaseous working medium sealed within the machine. A portion of this engine is maintained at a high temperature using the flue gas stream from the gasifier 10 or oxidizer 3, or by using hot clean air from the all-ceramic heat exchanger 4. Another portion of the engine is maintained at a constant low temperature, and the gaseous working medium is transferred between the hot and cold portions by movement of the engine's pistons. Thermal expansion at the hot end drives the pistons toward the cold end, compressing cold gas beneath the pistons. The reciprocating motion of the pistons powers the generator, and a regenerator is used between the hot and cold portions to increase efficiency. External combustion engine 29 requires hot side input temperatures of approximately 1800 degrees F. for proper function, and discharges gas at a moderate temperature, approximately 1500 degrees F.

The modified system can be configured in many ways, depending on the requirements of the specific application. Several configurations will now be described with respect to FIGS. 19–23.

Figure 22:
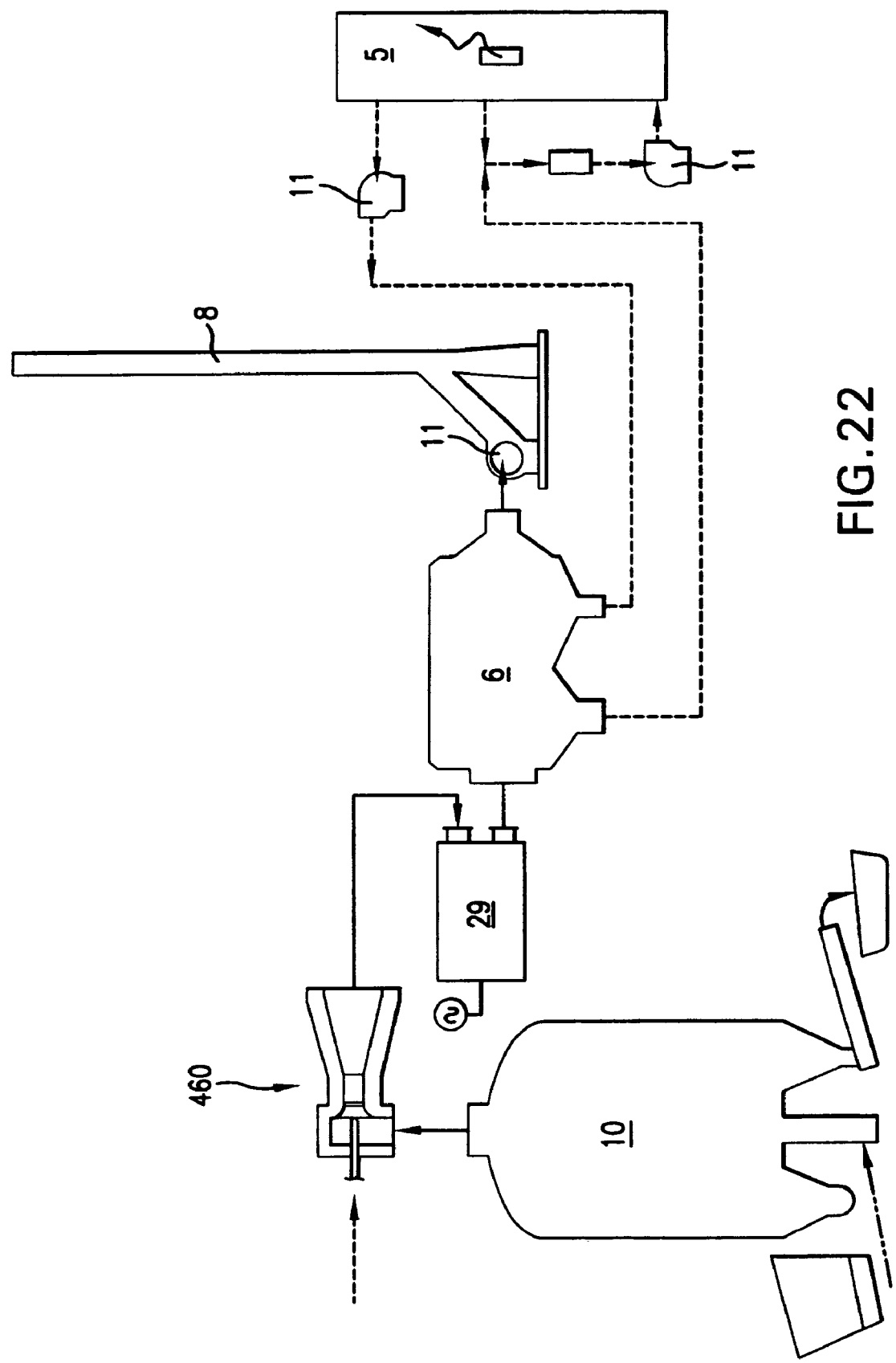
FIG. 22 is a schematic view of the system for pyrolyzing biomass to obtain useable ash and heat energy, modified from FIG. 1 to include a means for producing energy. An external combustion engine is fired using heat energy directly from the gasifier, and additional heat energy is recovered from the discharge of the external combustion engine using a heat exchanger.

When only power generation is required, and the fuel produces a relatively clean combustion flue gas, the discharge from gasifier 10 is used to fire external combustion engine 29, as shown in FIG. 22. Because combustion flue gas is discharged from the gasifier at temperatures of approximately 1000 degrees F., the temperature of the combustion flue gas is raised prior to entering external combustion engine 29 using conventional means, which may include, but is not limited to, re-combusting the combustion flue gas. Conventional external combustion engines may be purchased having re-combustion components. If desired, heat energy from the moderate temperature flue gas discharged from external combustion engine 29 may be recovered using an alloy metal heat exchanger for use in an external process 5, such as a lumber drying kiln.

Figure 19:
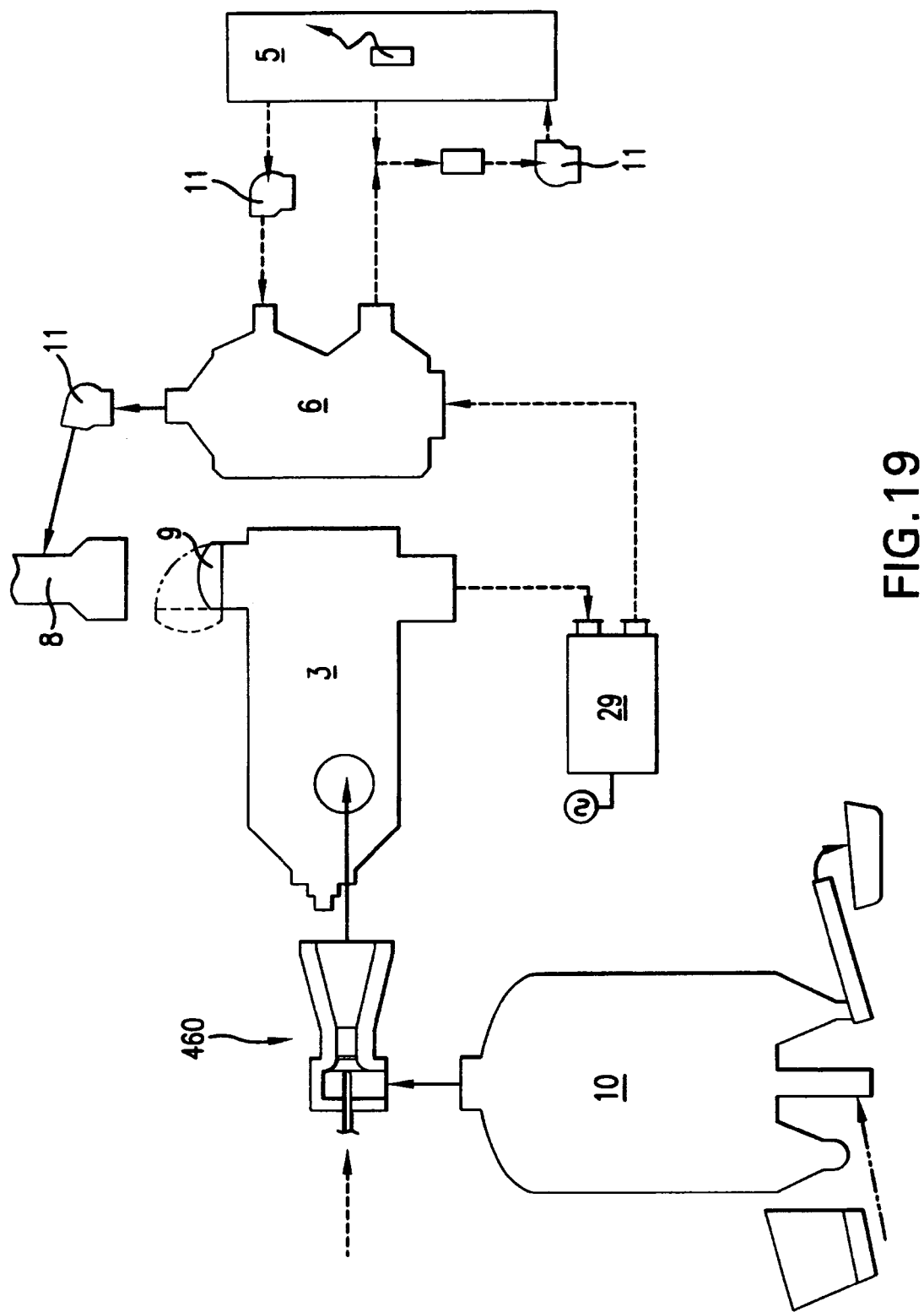
FIG. 19 is a schematic view of the system for pyrolyzing biomass to obtain useable ash and heat energy, modified from FIG. 1 to include a means for producing energy. An external combustion engine is fired using heat energy from the oxidizer, and additional heat energy is recovered from the discharge of the external combustion engine.

When only power generation is required, and the fuel is problematic, the inventive staged oxidizer 3 is included in the system. As shown in FIG. 19, the combustion flue gas from gasifier 10 is directed to oxidizer 3, and the discharge from oxidizer 3 is used to fire the external combustion engine. In this configuration, the temperature of the discharge from oxidizer 3 is tempered using tempering air manifold 480 from an approximate temperature of 2200 degrees F. to a an approximate temperature of 1800 degrees F., so as to provide the proper hot side input temperature for external combustion engine 29. If desired, heat energy from the moderate temperature flue gas discharged from external combustion engine 29 may be recovered using an alloy metal heat exchanger for use in an external process 5.

Figure 20:
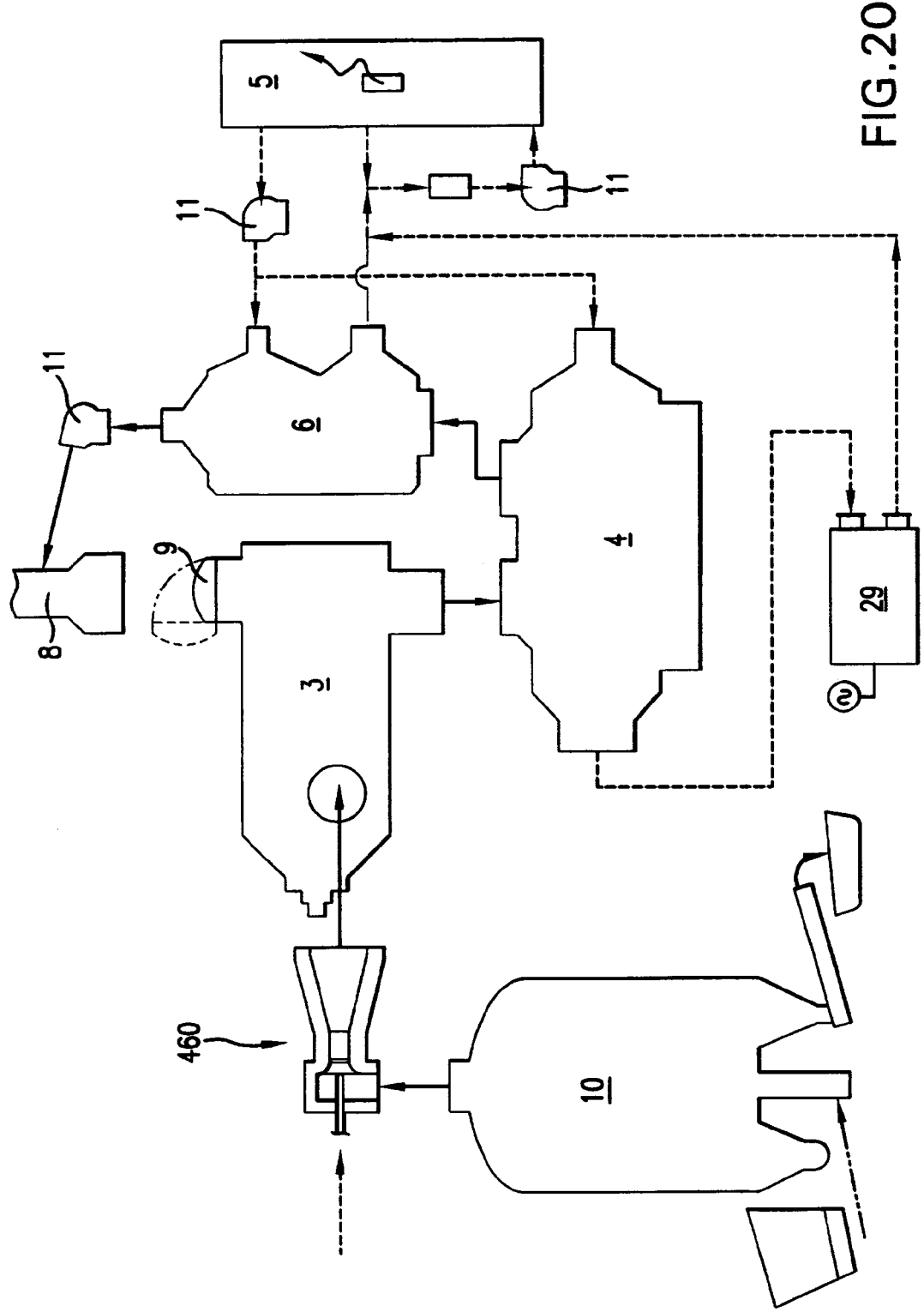
FIG. 20 is a schematic view of the system for pyrolyzing biomass to obtain useable ash and heat energy, modified from FIG. 1 to include a means for producing energy. An external combustion engine is fired using heat energy from the all-ceramic heat exchanger, and additional heat energy is recovered from the discharge of the all ceramic heat exchanger and the external combustion engine.

When the fuel is very problematic, for example producing a combustion flue gas having high quantities of particulate, the system can be configured as in FIG. 20. In this configuration, the fuel is gasified within gasifier 10, the combustion products from the gasifier are oxidized within oxidizer 3. Note that discharge from oxidizer 3 is not tempered, but is sent at approximately 2200 degrees F. to the air-side of all-ceramic heat exchanger 4. Within all-ceramic heat exchanger 4, air-side combustion flue gas transfers heat energy to tube-side clean air, providing clean hot air at temperatures of approximately 1800 degrees for use in firing external combustion engine 29. Air-side discharge from all-ceramic heat exchanger 4 can be directed to the tube-side of an alloy metal heat exchanger. Within alloy metal heat exchanger 6, tube-side flue gas transfers heat energy to air-side clean air, providing a preheated clean air for input to all-ceramic heat exchanger 4, and/or a source of hot clean air for use in an external process 5.

Figure 23:
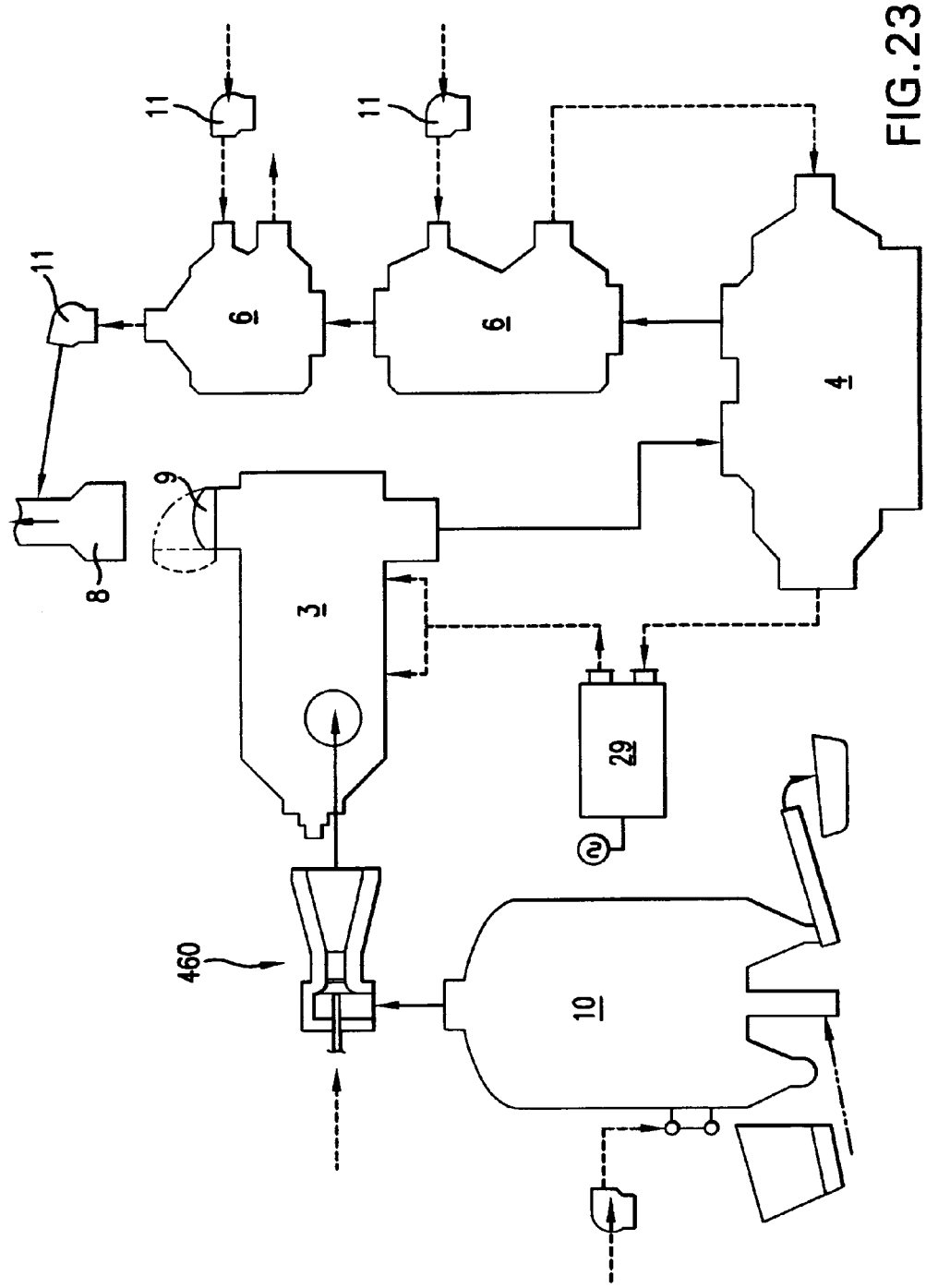
FIG. 23 is a schematic view of the system for pyrolyzing biomass to obtain useable ash and heat energy, modified from FIG. 1 to include a means for producing energy. An external combustion engine is fired using heat energy from the all ceramic heat exchanger, and moderate temperature discharge from the external combustion engine is used by the oxidizer as a source of preheated air.
Figure 24:
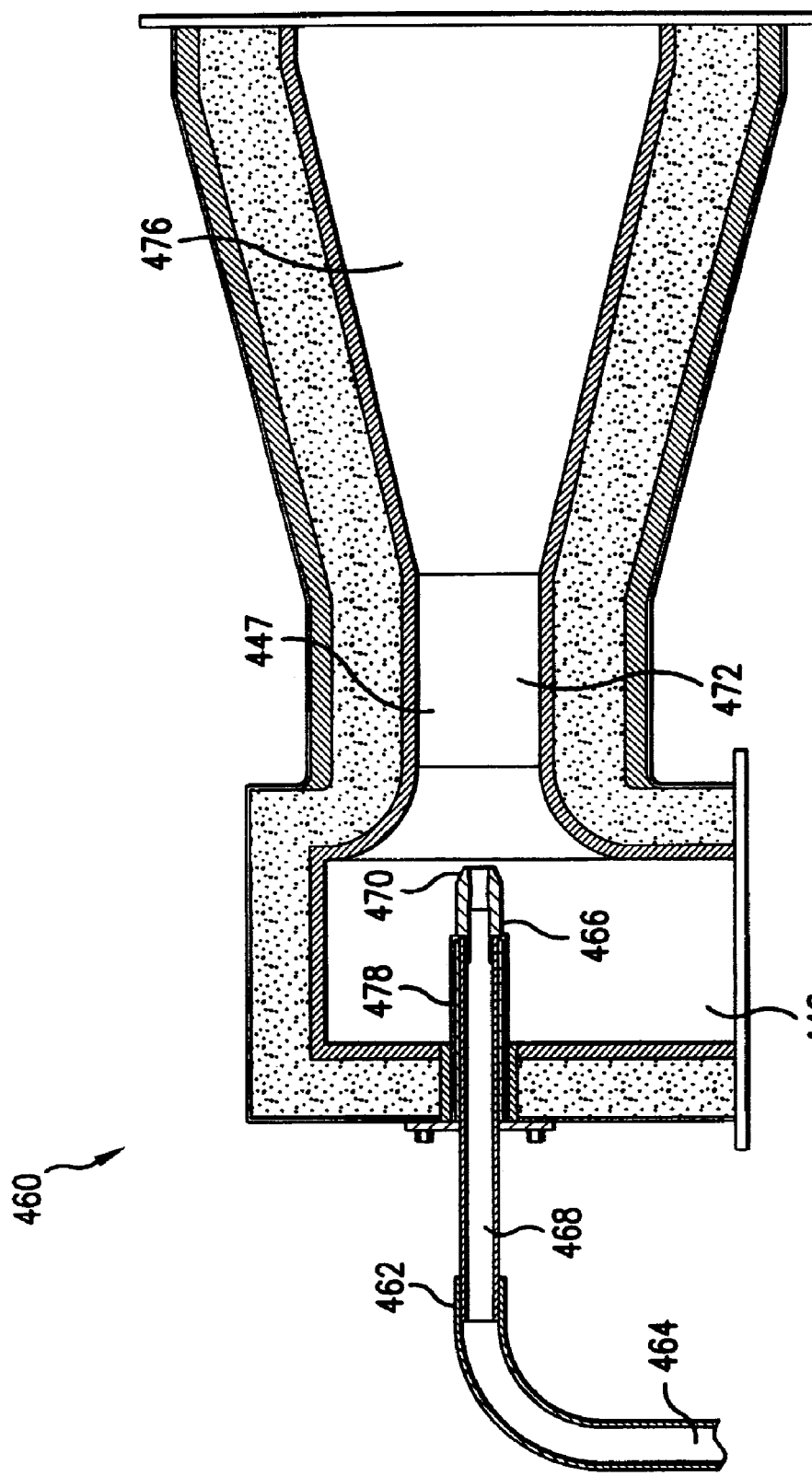
FIG. 24 is a side sectional view of the high temperature ejector assembly illustrating the shape of the venture section and the position of the nozzle with respect to the venture section.

Heat energy from the moderate temperature (approximately 1500 degrees F.) flue gas discharged from external combustion engine 29 may be used as a source of preheated air for use in staged cyclonic oxidizer 3 (as shown in FIG. 23). A direct result of the use of preheated air in oxidizer 3 is a reduction of almost 4 to 1 in the amount of fuel required by gasifier 10. Thus, the system disclosed in FIG. 23 is extremely efficient. In fact, the system disclosed in FIG. 23 is more efficient than air or gas micro-turbine systems, and does not require the high pressures and control systems associated with turbine systems. The quantity of power generated by external combustion engines 29 are equivalent to that produced by microturbines at a fraction of the cost. Further system efficiencies are obtained by including one or more metal alloy or metal heat exchangers 6 in the system downstream of the all-ceramic heat exchanger to recover additional heat energy. The additional heat energy recovered can be used as a source of preheated air in other components of the system, such as gasifier 10 or all-ceramic heat exchanger 4 (shown) or in an external process.

Alternatively, the heat energy may be recovered using a metal heat exchanger, as shown in FIG. 20, for use in an external process 5.

Figure 21:
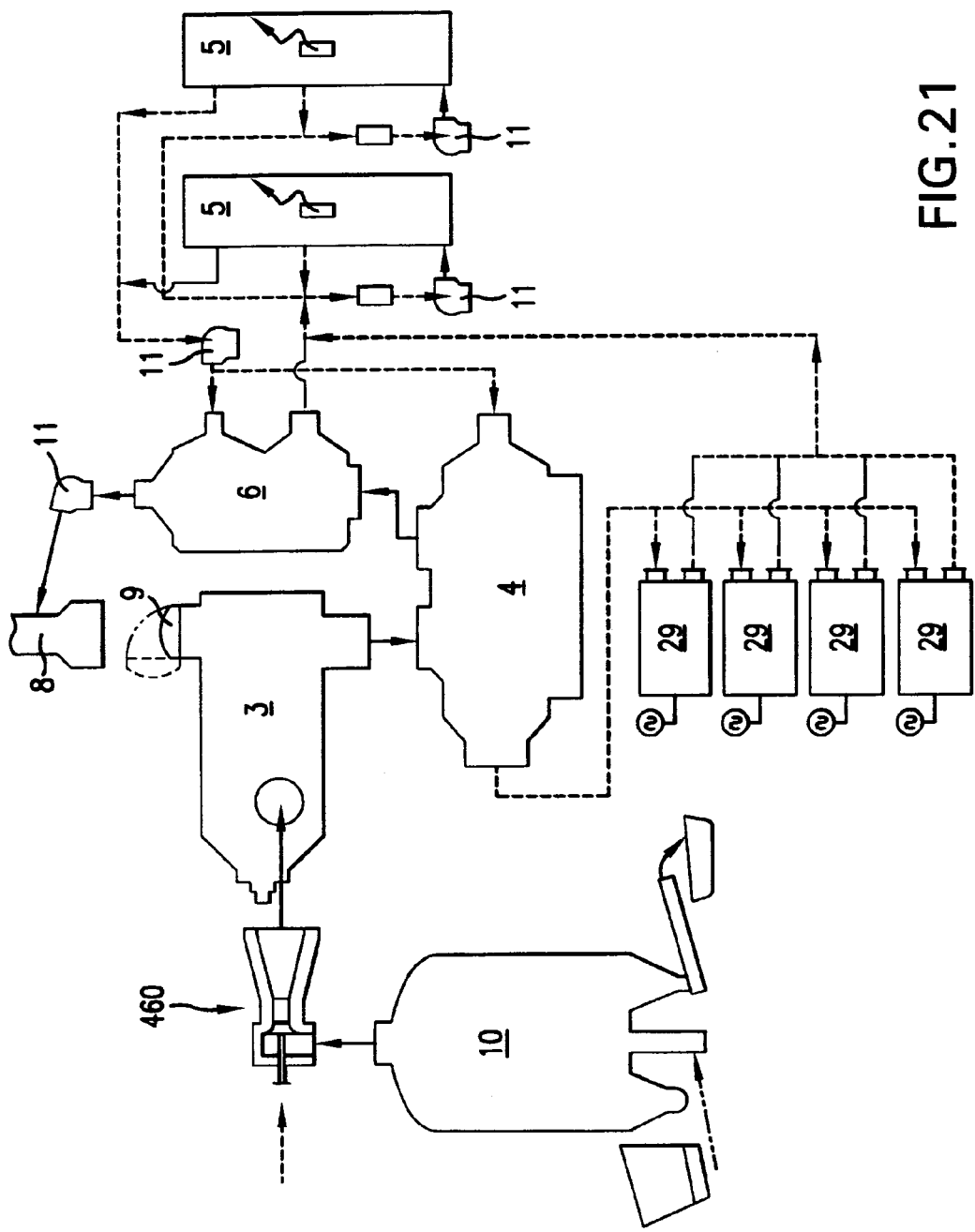
FIG. 21 is the schematic view of FIG. 20 modified to illustrate the use of plural external combustion engines.

FIG. 21 is a modification of FIG. 20 wherein the single external combustion engine 29 is replaced by a plurality of external combustion engines 29. These engines 29 are fired in parallel using hot, clean air discharged from all-ceramic heat exchanger 4, providing additional power generation as well as additional heat energy for use in additional, or larger scale, external processes. Those skilled in the art understand that plural external combustion engines 29 can replace a single external combustion engine in any system configuration.

Method of Gasification

A method of pyrolyzing biomass 2 or other solid waste at temperatures below 1000 degrees F. to obtain useable ash and heat energy without generating toxic byproducts will now be described. The method consists of partial primary combustion of biomass 2 within pyrolyzing gasifier 10 to produce useful ash and primary combustion flue gas, followed by secondary combustion of the primary combustion flue gas within staged, cyclonic oxidizer 3 to produce a generally clean flue gas, the generally clean flue gas then is directed to at least one heat exchanger 4, heat energy being recovered from the generally clean flue gas as it is passed through heat exchanger 4.

More specifically, the method of pyrolyzing biomass consists of the following steps:

Step 1. Biomass fuel 2 is fed into feed cone 31 of gasifier 10 up from below furnace bed 16 and along the central vertical axis 7 using conventional fuel feed apparatus 18.

Step 2. Biomass fuel 2 enters fuel collection hopper 40 of each respective cell 20 as it rises over annular margin 76.

Step 3. Partial primary combustion of biomass fuel 2 is initiated within each cell using ignition and stabilizing burner 118.

Step 4. Partial primary combustion of biomass fuel 2 occurs within each fuel collection hopper 40 under starved air conditions in the range of 20 to 40 percent stoichiometric by strict control and monitoring of air flow into each cell. Gasification temperatures are controlled so as to remain below 1000 degrees F. to prevent formation of undesirable compounds such phosphorous and sulfur. Temperatures within fuel pile 2 within each cell are monitored using sensor tube 100. Temperature information from sensor tube 100 is used to monitor burn rate and pile height, and is used to adjust air flow, fuel feed, and ash removal, allowing maximized fuel burn within each cell. Gasification of the fuel is continuous since the fuel feed rate is synchronized with the ash removal rate. As needed, air is injected into fuel collection hopper 40 using tuyeres 90, lances 150, or a combination of both.

The products of partial primary combustion are a usable ash suitable for fertilizer, and a partial primary combustion flue gas. The ash is removed from the bottom of fuel collection hopper using an all ceramic auger 200, or an ash ram 200. The partial primary combustion flue gas exits gasifier 10 through at outlet at the top of dome 12.

Step 5. The partial primary combustion flue gas is directed through fluid inlet duct 446 to oxidizer 3. While in fluid inlet duct 446 and immediately prior to entering oxidizer 3, air is injected into the primary combustion flue gas using high temperature ejector assembly 460, providing a primary combustion flue gas-air mixture having a sub-stoichiometric ratio of approximately 50 to 70 percent to control to a temperature of approximately 1800 degrees F.

Step 6. The primary combustion flue gas-air mixture enters the first stage 428 of oxidizer 3 where secondary combustion is initiated and performed at temperatures at or below 1800 degrees F. to prevent formation of NOx.

Step 7. Secondary combustion flue gas exits first stage 428 and enters second stage 430 where air is injected using the first baffle tuyere array 438 to enhance mixing and combustion and to control combustion temperatures, second stage 430 used to begin burnout of CO and VOCs.

Step 8. Secondary combustion flue gas exits second stage 430 and enters third stage 432 where air is injected using the second baffle tuyere array 440 to enhance mixing and combustion and to control combustion temperatures, third stage 432 allowing the flue gas to be maintained at a temperature in the range of 1600 to 2200 degrees F. for a time period of approximately one to two seconds to ensure complete burnout of CO and VOCs, and resulting in generally clean flue gas.

Step 9. The generally clean flue gas is discharged from oxidizer 3 via fluid outlet duct 448. While in fluid outlet duct 448 and immediately after exiting oxidizer 3, when appropriate, air is injected into the generally clean flue gas using tempering air manifold 480 to adjust the temperature of the generally clean flue gas without reducing mass flow from oxidizer 3.

Step 10. The generally clean flue gas-air mixture is directed into an all-refractory air-to-air indirect heat exchanger 4 so that energy can be recovered from the clean flue gas.

Step 11. The energy recovered using all-refractory air-to-air indirect heat exchanger 4 is used as an energy source in a wide variety of applications, including, but not limited to power generation (FIG. 20) or as a heat source for an external process 5 such as drying lumber within an industrial lumber kiln.

Step 12. The generally clean flue gas-air mixture exits from all-refractory air-to-air indirect heat exchanger 4 and is directed to a metal heat exchanger 6 where additional heat recovery occurs, resulting in improved system efficiency.

Step 13. The generally clean flue gas-air mixture exits from the metal heat exchanger 6 where it is released to the environment.

The method of pyrolyzing biomass 2 or other solid waste described above can be configured to produce energy extremely efficiently by including at least one external combustion engine 29 in the system, as described above.

A first method of pyrolyzing solid wastes to produce a useable ash and generate power using a gasification system, where the gasification system includes gasifier 10 and at least one external combustion engine 29 (FIG. 22), is as follows:

Step 1. Solid wastes are gasified within gasifier 10 producing ash and combustion flue gases.

Step 2. The combustion flue gases discharged from gasifier 10 are directed to an external combustion engine 29, and used therein to fire external combustion engine 29, external combustion engine 29 generating power and producing a moderate temperature flue gas discharge. It is understood that, if desired, plural external combustion engines 29 can be used and fired simultaneously for additional power generation.

If desired, additional heat energy can be recovered from the flue gas discharge of external combustion engine 29 as follows:

Step 3. The flue gas discharge from external combustion engine 29 is directed to heat exchanger 6, heat exchanger 6 recovering heat energy from the flue gas discharge.

A second method of pyrolyzing solid wastes to produce a useable ash and generate power using a gasification system, wherein the gasification system includes gasifier 10, staged cyclonic oxidizer 4, and at least one external combustion engine 29, is as follows:

Step 1. Solid wastes are gasified within gasifier 10 producing ash and combustion flue gases.

Step 2. The combustion flue gases discharged from gasifier 10 are directed to staged cyclonic oxidier 3.

Step 3. The combustion flue gases are oxidized within the staged cylonic oxidizer 3 and discharged as clean flue gas.

Step 4. The temperature of clean flue gas discharged from oxidizer 3 is adjusted using tempering air manifold 480. Clean flue gases are reduced from approximately 2200 degrees F. to the required inlet temperature of external combustion engine 29, approximately 1800 degrees F.

Step 5. The clean flue gas from oxidzer 3 is directed to external combustion engine 29 and used therein to fire external combustion engine 29, external combustion engine 29 generating power and discharging flue gas. It is understood that, if desired, plural external combustion engines 29 can be used and fired simultaneously for additional power generation.

If desired, additional heat energy can be recovered from the flue gas discharge of external combustion engine 29 as follows:

Step 6. The flue gas discharge from external combustion engine 29 is directed to heat exchanger 6, heat exchanger 6 recovering heat energy from the flue gas discharge.

A third method of pyrolyzing solid wastes to produce a useable ash and generate power using a gasification system, wherein the gasification system includes gasifier 10, a staged cyclonic oxidizer 3, at least one external combustion engine 29, and an all-ceramic air-to-air indirect heat exchanger 4 (FIG. 20) is as follows:

Step 1. Solid wastes are gasified within gasifier 10 producing ash and combustion flue gases.

Step 2. The combustion flue gases discharged from gasifier 10 are directed to staged cyclonic oxidier 3.

Step 3. The combustion flue gases are oxidized within the staged cylonic oxidizer 3 and the resulting "clean" flue gas is discharged from staged cyclonic oxidizer 3 and directed to the air-side of an all-ceramic air-to-air indirect heat exchanger 4. Note that no temperature modification is required of the oxidizer flue gas discharge.

Step 4. Within all-ceramic air-to-air indirect heat exchanger 4, the hot, air-side combustion flue gases heat clean, tube-side air.

Step 5. The hot clean air is discharged from the tube side of all-ceramic heat exchanger 4 and is directed external combustion engine 29. Hot combustion flue gases are discharged from the air-side of all-ceramic heat exchanger 4 and directed to the stack 8 or an alloy metal heat exchanger 6 for additional heat energy recovery.

Step 6. Hot clean air from all-ceramic heat exchanger 4 is used to fire external combustion engine 29, external combustion engine 29 then generating power. It is understood that, if desired, plural external combustion engines 29 can be used and fired simultaneously for additional power generation.

If desired, additional heat energy can be recovered from the flue gas discharge of external combustion engine 29 as follows:

Step $7_1$. The flue gas discharge from external combustion engine 29 is directed to heat exchanger 6, heat exchanger 6 recovering heat energy from the flue gas discharge.

Alternatively, the heated gas from the discharge of external combustion engine 29 can be used as a source of preheated air for staged oxidizer 3 (FIG. 23) as follows:

Step $7_2$. The flue gas discharge from external combustion engine 29 is directed to staged cyclonic oxidizer 3 where it is used as a source of preheated air.

While I have shown and described the preferred embodiment of my invention, it will be understood that the invention may be embodied otherwise than as herein specifically illustrated and described, and that certain changes in the form and arrangements of parts and the specific manner of practicing the invention may be made within the underlying idea or principles of the invention within the scope of the appended claims.

I claim:

1. A gasifier for pyrolyzing organic material, the gasifier comprising a plurality of individual modular cells, the individual cells joined together to form a furnace bed, each individual cell being completely lined with refractory material wherein each cell is provided with air injections means, and wherein the air injection means of each cell is controlled independently to provide individually controlled burn regions, the upper end of the gasifier being closed and sealed using a monolithic dome, the dome comprising a hemi-elliptical section, the hemi-elliptical section comprising a height to diameter ratio of at least 1 to 2, the dome being completely lined with refractory material, a cylindrical sidewall, the sidewall comprising a lower edge, an upper edge, and a refractory lined inner surface, wherein the lower edge of the sidewall is fixed to the furnace bed, the upper edge of the sidewall is fixed to the periphery of the monolithic dome, the sidewall centered on the vertical centerline of the gasifier.

2. The gasifier of claim 1 wherein each individual cell comprises an overall wedge shape, each individual cell comprising a base, an apex, a first lateral edge and a second lateral edge, the base comprising a curvilinear contour which is identical to that of the sidewall of the gasifier, the apex of the individual cell being truncated adjacent the vertical centerline of the gasifier, the first lateral edge being spaced apart from the second lateral edge such that the respective lateral edges converge from base to apex, the plurality of individual cells are joined together along their respective lateral edges such that the furnace bed is annular and segmented.

3. The gasifier of claim 2 wherein each individual cell comprises a feed cone portion and a fuel collection hopper, the feed cone portion overlying the apex, the fuel collection hopper residing between the feed cone portion and the base, the fuel collection hopper being separated from the feed cone portion by an linear, generally horizontal rim section, wherein the fuel collection hopper comprises an downwardly converging duct provided in the shape of an inverted pyramid, the fuel collection hopper comprising an upper edge, a lower edge, an inner face, an outer face, a first lateral face and a second lateral face, the upper edge of the fuel collection hopper comprising a closed, four-sided shape, the lower edge of the fuel collection hopper comprising a rectangular shape, the upper edge being separated from the lower edge by the respective inner, outer, first lateral, and second lateral faces, the inner face of the fuel collection hopper intersects the upper edge of the fuel collection hopper along the rim section, the outer face of the fuel collection hopper intersects the upper edge of the fuel collection hopper along the sidewall of the gasifier, the first and second lateral faces each extending between the inner face and the outer face, the sloped surfaces of the inner face, outer face, first lateral face and second lateral face converging to the lower edge, the lower edge defining a lower opening through which the solid by-products of combustion are removed from the gasifier.

4. The gasifier of claim 3 wherein the rim section of each individual cell comprises a first end adjacent the first lateral face and a second end adjacent the second lateral face such that when the plurality of individual cells are joined together along their respective lateral edges so as to form an annular, segmented furnace bed, the respective first end of the rim section of a cell confronts and abuts the respective second end of the rim section of the adjacent cell, forming an annular margin centered on the vertical centerline of the gasifier, the feed cone portion comprising a planar feed surface which slopes downward and inward from the margin, the feed surface comprising an upper edge, a lower edge, a first lateral side edge, and a second lateral side edge, the upper edge of the feed surface intersecting the margin, the lower edge of the feed surface opposed to the upper edge, the first and second lateral side edges of the feed surface extending between the respective upper and lower edges of the feed surface such that when the plurality of individual cells are joined together along their respective lateral edges so as to form an annular, segmented furnace bed, the respective first lateral side edge of the feed surface of a cell confronts and abuts the respective second lateral side edge of the feed surface of the adjacent cell, forming a general conical feed duct centered on the vertical centerline of the gasifier defining a duct through which fuel material is fed into the gasifier.

5. The gasifier of claim 4 wherein each individual cell is provided with a temperature sensing probe, the temperature sensing probe comprising an elongate rod, the rod having a first end, a second end opposed to the first end, and a body portion which lies between and separates the first end from the second end, the rod comprising a thermocouple embedded in the second end, the rod comprising at least two thermocouples embedded in the body portion, the thermocouples positioned on the rod in a spaced apart relationship, the rod being provided in a length such that the first end resides adjacent to the upper edge of the fuel collection hopper and the second end resides adjacent to the lower edge of the fuel collection hopper so that the temperature can be measured simultaneously at multiple locations within the cell.

6. The gasifier of claim 5 wherein the temperature sensing probe is embedded in the inner face of the fuel collection hopper.

7. The gasifier of claim 5 wherein each cell is provided with air injection means, and wherein the air injection means of each cell is controlled independently of independently of the remaining cells.

8. The gasifier of claim 7 wherein air injection means comprises a first tuyere array within the gasifier to introduce air within each individual cell, the first tuyere array comprising plural refractory nozzles positioned on the inner face of the fuel collection hopper such that they oriented at an angle which lies in the range from zero to 45 degrees downward from the horizontal, and are directed into a pile of fuel material within the cell.

9. The gasifier of claim 8 wherein air injection means comprises a second tuyere array within the gasifier to introduce air within each individual cell, the second tuyere array comprising plural refractory nozzles positioned on the outer face of the fuel collection hopper such that they oriented at an angle which lies in the range from zero to 45 degrees downward from the horizontal and are directed into a pile of fuel material within the cell.

10. The gasifier of claim 9 wherein air injection means comprises a third tuyere array within the gasifier to introduce air within each individual cell, the third tuyere array comprising plural refractory nozzles positioned on the first lateral face of the fuel collection hopper such that they oriented at an angle which lies in the range from zero to 45 degrees downward from the horizontal and are directed into a fuel pile within the cell, and wherein air injection means comprises a a fourth tuyere array within the gasifier to introduce air within each individual cell, the fourth tuyere array comprising plural refractory nozzles positioned on the second lateral face of the fuel collection hopper such that they oriented at an angle which lies in the range from zero to 45 degrees downward from the horizontal and are directed into a pile of fuel material within the cell.

11. The gasifier of claim 10 wherein air injection means comprises a fifth tuyere array within the gasifier to introduce air within each individual cell, the fifth tuyere array comprising plural refractory nozzles positioned on the feed cone portion such that they oriented at an angle which lies in the range from zero to 45 degrees downward from the horizontal, and are directed into fuel material within the feed cone portion.

12. The gasifier of claim 11 wherein a tuyere array comprises plural refractory nozzles in a linear, horizontally spaced arrangement.

13. The gasifier of claim 7 wherein air injection means comprises plural sets of refractory tuyeres such that air is propelled into the cell from at least one set of refractory tuyeres, the at least one set of refractory tuyeres being selected from the following sets of refractory tuyeres: a set of refractory tuyeres positioned on the inner face of the fuel collection hopper, a set of refractory tuyeres positioned on the outer face of the fuel collection hopper, a set of refractory tuyeres positioned on the first lateral face of the fuel collection hopper, a set of refractory tuyeres positioned on the second lateral face of the fuel collection hopper, and a set of refractory tuyeres positioned on the feed surface of the feed cone portion, the air injection means being controllable so that air may be introduced in a steady flow, and alternatively so that air may be introduced in a pulsed flow, the air injection means being controllable such that air flow to each tuyere array within a cell is controlled independently of the remaining tuyere arrays within a cell.

14. The gasifier of claim 13 wherein a set of refractory tuyeres comprises plural refractory nozzles in a linear, horizontally spaced arrangement, positioned on the respective face of the individual cell such that they oriented at an angle which lies in the range from zero to 45 degrees downward from the horizontal.

15. The gasifier of claim 14 wherein the source of air for each set of refractory tuyeres is provided by a manifold, and wherein each tuyere comprises an opening within the refractory lining of the cell, each tuyere comprises an elongate steel pipe, the pipe comprising a first end, a second end, and a body portion between the first end and second end, the pipe extending through the cell wall such that the first end lies outside the cell and the second end lies within the refractory lining of the cell such that it is offset from and in fluid communication with the opening, the manifold being selectively releasably secured to the body portion of the pipe adjacent to the first end such that it resides outside the cell.

16. The gasifier of claim 15 wherein the first end of the pipe comprises means for selective closure of the first end so that during normal operation the first end of the pipe is closed and during maintenance of the tuyere, the first end can be opened to allow the pipe and opening to cleaned.

17. The gasifier of claim 7 wherein air injection means comprises at least one all-refractory air injection lance, the at least one lance comprising an elongate hollow lance tube, the lance tube having a first end, a second end, and a body which extends between the first end and the second end, the lance tube being generally horizontally oriented within the cell such that it extends radially with the first end abutting the rim section and the second end adjacent the sidewall, the lance tube comprising plural, horizontally-oriented, spaced-apart holes, the holes being in fluid communication with the hollow interior of the lance tube such that when air is propelled from the second end of the lance tube to the first end of the lance tube the air exits the lance tube through the holes an is injected into the cell.

18. The gasifier of claim 17 wherein the at least one lance comprises one lance, and the one lance is centered between the first lateral sidewall and the second lateral sidewall.

19. The gasifier of claim 17 wherein the at least one lance comprises a first lance and a second lance, wherein the first lance lies along the first lateral sidewall and the second lance lies along the second lateral sidewall.

20. The gasifier of claim 17 wherein the at least one lance comprises a first lance, a second lance, and a third lance, wherein the first lance lies along the first lateral sidewall, the second lance lies along the second lateral sidewall, and the third lance is centered between the first lateral sidewall and the second lateral sidewall.

21. The gasifier of claim 17 wherein the at least one lance is stationary.

22. The gasifier of claim 17 wherein the at least one lance comprises a longitudinal axis which extends between the first end and the second end, and wherein the at least one lance is movable such that the at least one lance is translatable along the longitudinal axis, and such that the at least one lance is twistable about the longitudinal axis.

23. The gasifier of claim 7 wherein air injection means comprises at least one all-refractory air injection lance, the at least one lance comprising an elongate hollow lance tube, the lance tube having a first end, a second end, and a body which extends between the first end and the second end, the lance tube being generally horizontally oriented within the cell such that it extends radially with the first end abutting the rim section and the second end adjacent the sidewall, the lance tube comprising plural, horizontally-oriented, spaced-apart holes, the holes being in fluid communication with the hollow interior of the lance tube such that when air is propelled from the second end of the lance tube to the first end of the lance tube the air exits the lance tube through the holes an is injected into the cell, and wherein air injection means further comprises plural sets of refractory tuyeres such that air is propelled into the cell from at least one set of refractory tuyeres, the at least one set of refractory tuyeres being selected from the following sets of refractory tuyeres: a set of refractory tuyeres positioned on the inner face of the fuel collection hopper, a set of refractory tuyeres positioned on the outer face of the fuel collection hopper, a set of refractory tuyeres positioned on the first lateral face of the fuel collection hopper, a set of refractory tuyeres positioned on the second lateral face of the fuel collection hopper, and a set of refractory tuyeres positioned on the feed surface of the feed cone portion.

24. The gasifier of claim 7 wherein each individual cell is provided with ash removal means for removal of the solid by-products of combustion from the cell, the ash removal means positioned immediately below the lower opening of the fuel collection hopper.

25. The gasifier of claim 24 wherein the ash removal means comprises a horizontally oriented, elongate, refractory lined channel, and a refractory piston comprising a cross section sized and shaped to closely fit within and slide longitudinally within the channel, the channel comprising a first end, a second end opposed to the first end, and a body portion which lies between the first end and the second end, the channel comprising a first opening, the first opening positioned on the upper side of the body portion at a location which is spaced apart from the respective first and second ends of the channel, the first opening positioned so that it sealingly abuts, confronts, and is in vertical alignment with the lower opening of the fuel collection hopper, the channel comprising a second opening, the second opening positioned on the lower side of the body portion adjacent to the first end, the piston comprising a length which longer than the longitudinal length of the first opening, the piston comprising a first position within the channel and a second position within the channel such that when the piston is in the first position, the piston resides generally midway between the respective first and second ends of the channel, lying directly below the first opening so that the first opening is completely obstructed by the piston, and when the piston is in the second position, the piston resides generally adjacent to the second end of the channel so that the first opening is completely unobstructed by the piston and fuel material is permitted to fall from the fuel collection hopper into the channel.

26. The gasifier of claim 25 wherein the ash removal means comprises a vertically oriented, elongate, refractory lined channel extension which intersects the lower side of the channel at the second opening, the channel extension comprising a first air sealing means, the first air sealing means comprising a refractory slide gate, the slide gate extending horizontally through a slit in the channel extension sidewall such that it is positionable across the channel extension, the slide gate being received within and supported by a shallow groove formed in the opposing side wall, the first air sealing means comprising gasketing means provided about the periphery of the slit and within the shallow groove so as to prevent air leakage about the slide gate, the slide gate comprising a first position wherein the slide gate extends across the channel extension and provides a sealed closure to the second opening, the slide gate comprising a second position wherein the slide gate is retracted within the slit providing an unobstructed path through the second opening.

27. The gasifier of claim 26 wherein the channel comprises a second air sealing means, the second air sealing means comprising a gasket ring embedded within the channel wall adjacent to the first opening such that it lies between the first opening and the second end of the channel, and such that it abuts and confronts the peripheral surface of the piston regardless of the longitudinal position of the piston within the channel so as to provide an air seal between the second end of the channel and the first opening.

28. The gasifier of claim 25 wherein ash removal means comprises a vertically oriented refractory flapper, the flapper comprising a cross section sized and shaped to provide a sealing fit within the channel, the flapper residing within the channel adjacent to the first opening such that it lies between the first opening and the first end of the channel, the flapper pivotally secured to the upper side of the body portion of the channel such that it hangs downward and is transversely oriented within the channel so as to provide a barrier between the first opening and the first end of the channel when the piston is in the second position, and so as to be urged to an open, generally horizontal orientation adjacent to and in parallel with the upper side of the channel when the piston is in the first position.

29. The gasifier of claim 24 wherein the ash removal means comprises a horizontally oriented, elongate, refractory-lined cylindrical channel and a refractory auger, the channel comprising a first end, a second end opposed to the first end, and a body portion which lies between the first end and the second end, the channel comprising a first opening, the first opening positioned on the upper side of the body portion at a location which is adjacent to the first end of the channel, the first opening positioned so that it sealingly abuts, confronts, and is in vertical alignment with the lower opening of the fuel collection hopper, the channel comprising a second opening, the second opening positioned on the lower side of the body portion adjacent to the second end, the channel comprising a vertically oriented, elongate, refractory lined channel extension which intersects the lower side of the channel at the second opening, the auger comprising an elongate tube, the tube comprising a longitudinal axis aligned with the longitudinal axis of the channel, the auger comprising a helical blade extending radially outward from the tube, the helical blade comprising an outer diameter sized and shaped to fit closely within the channel, the auger rotating about its longitudinal axis within the channel, the auger comprising a first end which terminates within the first end of the channel, the auger comprising a second end which terminates within the second end of the channel, such that when the auger is in use, fuel material is propelled from the first end of the channel to the second end of the channel where it falls into the channel extension.

30. The gasifier of claim 29 wherein the elongate tube of the auger is hollow, and wherein the auger comprises air introduction means, the air introduction means comprising openings within the elongate tube such that when air is propelled through the elongate tube it exits from the openings within the elongate tube and is injected into the cell.

31. The gasifier of claim 29 wherein the helical blade of the auger comprises a graduated pitch such that the spacing of the flights of the helical blade at the first end of the auger are a shorter distance than the spacing of the flights of the helical blade at the second end of the auger.

32. The gasifier of claim 29 wherein the channel extension is provided with an all-refractory rotary air lock, the rotary air lock allowing fuel material to pass downward through the channel extension while preventing air flow through the channel extension.

33. The gasifier of claim 7 wherein the number of individual modular cells which comprises the plurality of individual modular cells is 8.

34. The gasifier of claim 7 wherein the number of individual modular cells which comprises the plurality of individual modular cells is 4.

35. The gasifier of claim 7 wherein the hemi-elliptical section of the dome comprises a height to diameter ratio of at least 1 to 3.

36. A pyrolyzing gasifier for use in gasifying biomass, the gasifier comprising a generally cylindrical body, the cylindrical body having a closed upper end, a hollow cylindrical mid section, a substantially closed lower end, and a vertically oriented centerline, the cylindrical body comprising a steel outer shell having a refractory inner lining, wherein the upper end comprises a hemi-elliptical dome, the mid section comprising a sidewall, the side wall comprising an upper end which abuts the dome, the sidewall comprising a lower end which is opposed to the upper end, the lower end comprises an annular refractory furnace bed, the annular furnace bed being segmented into plural stationary cells, each cell being wedge-shaped so as to comprise an apex and a base, the apex of each cell being coincident with the vertically oriented centerline, the base of each cell abutting the lower end of the sidewall, each cell comprising lateral sides extending between the apex and the base, each cell abutting the adjacent cell along the respective lateral sides of each cell.

37. The pyrolyzing gasifier of claim 36 wherein each cell is provided with air introduction means and temperature sensing means, and wherein the air introduction means and temperature sensing means within each cell is monitored and controlled independently of the remaining cells.

38. The pyrolyzing gasifier of claim 37 wherein the air introduction means and the temperature sensing means are formed of refractory materials.

39. The pyrolyzing gasifier of claim 38 wherein each cell comprises a downwardly converging duct for receiving biomass therewithin, the downwardly converging duct comprising an open upper edge, an open lower edge, and sidewalls extending between the upper edge and lower edge, each cell comprising all-refractory ash removal means positioned below and in vertical alignment with the lower edge.

40. The pyrolyzing gasifier of claim 39 wherein ash removal means comprises a refractory channel and a refractory auger residing within the channel such that when the auger is rotated, ash is propelled through the channel.

41. The pyrolyzing gasifier of claim 39 wherein ash removal means comprises a refractory channel and a refractory ash ram residing within the channel such that when the ash ram is translated within the channel, ash is propelled through the channel.

42. The pyrolyzing gasifier of claim 39 wherein the temperature sensing means comprises an elongate rod, the rod having a first end, a second end opposed to the first end, and a body portion which lies between and separates the first end from the second end, the rod comprising a thermocouple embedded in the second end, the rod comprising at least two thermocouples embedded in the body portion, the thermocouples positioned on the rod in a spaced apart relationship, the rod being provided in a length such that the first end resides adjacent to the upper edge of the downwardly converging duct and the second end resides adjacent to the lower edge of the downwardly converging duct so that the temperature can be measured simultaneously at multiple locations within the cell.

43. The pyrolyzing gasifier of claim 39 wherein the air introduction means comprises at least one all-refractory air injection lance, the at least one lance comprising an elongate hollow lance tube, the lance tube having a first end, a second end, and a body which extends between the first end and the second end, the lance tube being generally horizontally oriented within the cell such that it extends radially with the first end abutting the rim section and the second end adjacent the sidewall, the lance tube comprising plural, horizontally-oriented, spaced-apart holes, the holes being in fluid communication with the hollow interior of the lance tube such that when air is propelled from the second end of the lance tube to the first end of the lance tube the air exits the lance tube through the holes an is injected into the cell.

44. The pyrolyzing gasifier of claim 39 wherein the sidewalls of the cell comprise an inner face, an outer face, a first lateral face, and a second lateral face, wherein the air introduction means comprises plural sets of refractory tuyeres such that air is propelled into the cell from at least one set of refractory tuyeres, the at least one set of refractory tuyeres being selected from the following sets of refractory tuyeres: a set of refractory tuyeres positioned on the inner face, a set of refractory tuyeres positioned on the outer face, a set of refractory tuyeres positioned on the first lateral face, a set of refractory tuyeres positioned on the second lateral face.

45. The pyrolyzing gasifier of claim 39 wherein the sidewalls of the cell comprise an inner face, an outer face, a first lateral face, and a second lateral face, wherein the air introduction means comprises a combination of at least one all-refractory air injection lance and at least one set of refractory tuyeres, the at least one lance comprising an elongate hollow lance tube, the lance tube having a first end, a second end, and a body which extends between the first end and the second end, the lance tube being generally horizontally oriented within the cell such that it extends radially with the first end abutting the rim section and the second end adjacent the sidewall, the lance tube comprising plural, horizontally-oriented, spaced-apart holes, the holes being in fluid communication with the hollow interior of the lance tube such that when air is propelled from the second end of the lance tube to the first end of the lance tube the air exits the lance tube through the holes an is injected into the cell, the at least one set of refractory tuyeres being selected from a plurality of sets of refractory tuyeres, the plurality of sets of refractory tuyeres comprising the following: a set of refractory tuyeres positioned on the inner face, a set of refractory tuyeres positioned on the outer face, a set of refractory tuyeres positioned on the first lateral face, a set of refractory tuyeres positioned on the second lateral face.

46. A refractory probe for determining the temperature gradient within a furnace, the refractory probe comprising an elongate refractory body, the body comprising a length, the body comprising a plurality of thermocouples spaced apart along the length of the body and embedded thereon, the thermocouples providing a means for simultaneous temperature measurement at multiple locations.

47. The refractory probe of claim 46 wherein the plurality of thermocouples comprises at least three thermocouples.

* * * * *